(12) United States Patent
Hori et al.

(10) Patent No.: US 8,885,971 B2
(45) Date of Patent: Nov. 11, 2014

(54) IMAGE PROCESSING APPARATUS, IMAGE PROCESSING METHOD, AND STORAGE MEDIUM

(75) Inventors: Shinjiro Hori, Yokohama (JP); Kouta Murasawa, Yokohama (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 13/553,589

(22) Filed: Jul. 19, 2012

(65) Prior Publication Data
US 2013/0022290 A1 Jan. 24, 2013

(30) Foreign Application Priority Data
Jul. 23, 2011 (JP) ................................ 2011-161445

(51) Int. Cl.
*G06K 9/40* (2006.01)
*G06K 9/36* (2006.01)
*H04N 5/00* (2011.01)

(52) U.S. Cl.
CPC ... *G06K 9/36* (2013.01); *H04N 5/00* (2013.01)
USPC ............ 382/274; 382/167; 382/260; 382/264

(58) Field of Classification Search
USPC .................. 382/264, 260, 274, 167; 348/335, 348/222.1, 251, 234, E5.031; 378/22, 25, 378/58
See application file for complete search history.

(56) References Cited

U.S. PATENT DOCUMENTS

| | | | |
|---|---|---|---|
| 6,501,822 B2 * | 12/2002 | Roder | 378/22 |
| 7,489,345 B2 * | 2/2009 | Fukumoto | 348/222.1 |
| 7,764,319 B2 * | 7/2010 | Fukumoto | 348/335 |
| 2011/0032581 A1 | 2/2011 | Ikeda | |
| 2012/0219228 A1 | 8/2012 | Osako et al. | |

FOREIGN PATENT DOCUMENTS

| | | |
|---|---|---|
| JP | 2009-003858 A | 1/2009 |
| JP | 2009-218704 A | 9/2009 |
| JP | 2010-251999 A | 11/2010 |
| JP | 2010-273144 A | 12/2010 |
| JP | 2011-10162 A | 1/2011 |

OTHER PUBLICATIONS

U.S. Appl. No. 13/553,548, filed Jul. 19, 2012, Kouta Murasawa.

* cited by examiner

*Primary Examiner* — Anh Do
(74) *Attorney, Agent, or Firm* — Canon USA, Inc., IP Division

(57) ABSTRACT

An image processing apparatus includes an input unit configured to input image data, a detection unit configured to detect a region corresponding to local light in an image represented by the image data input by the input unit, and a processing unit configured to perform blur processing on the region corresponding to the local light and detected by the detection unit, wherein the processing unit varies, according to a position of the region corresponding to the local light and detected by the detection unit, an area on which to perform the blur processing.

17 Claims, 30 Drawing Sheets

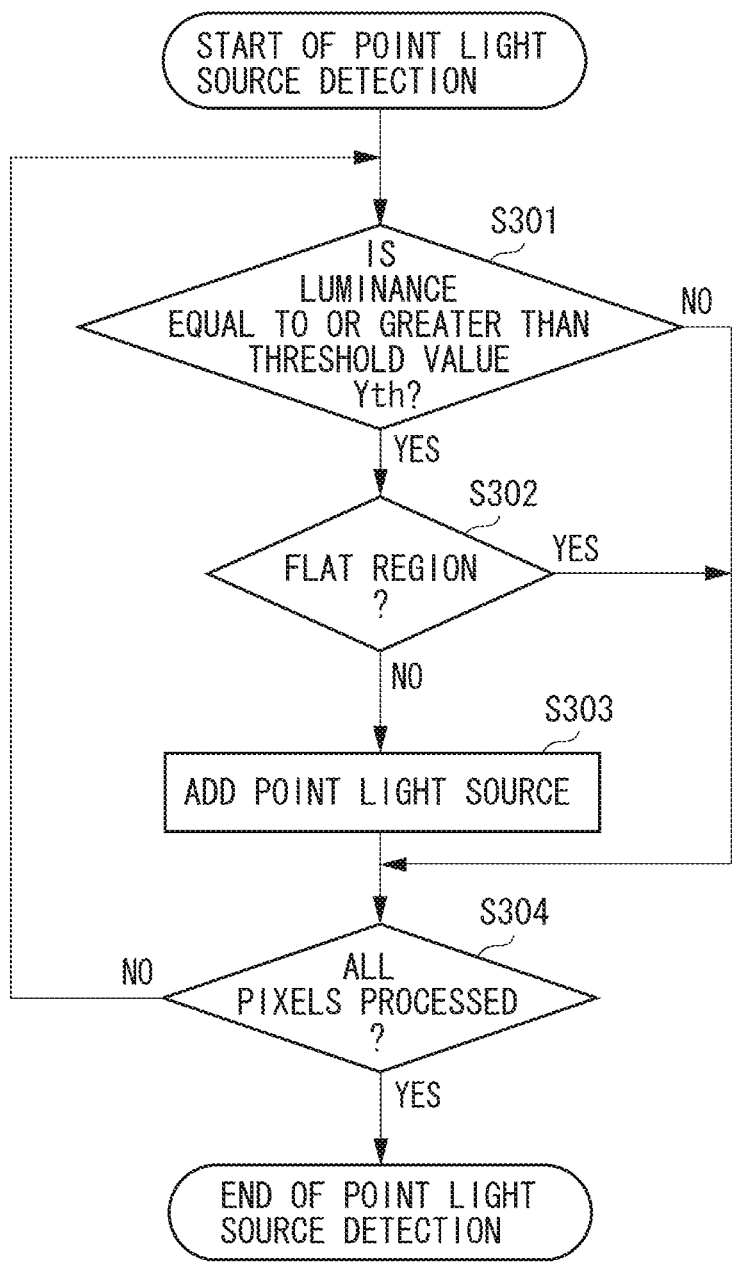

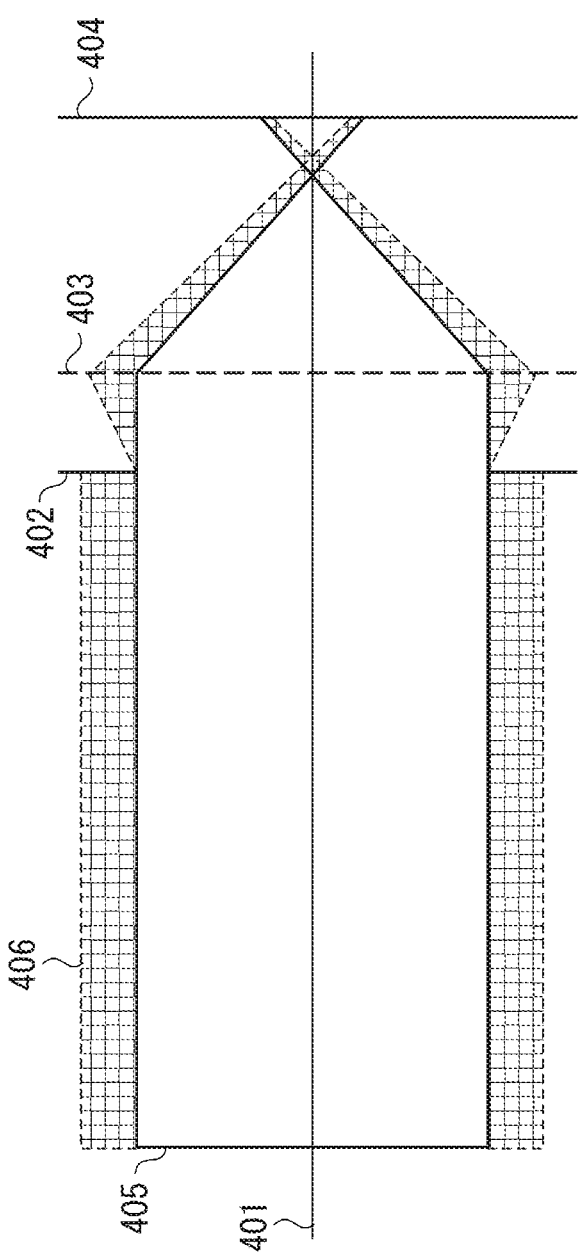

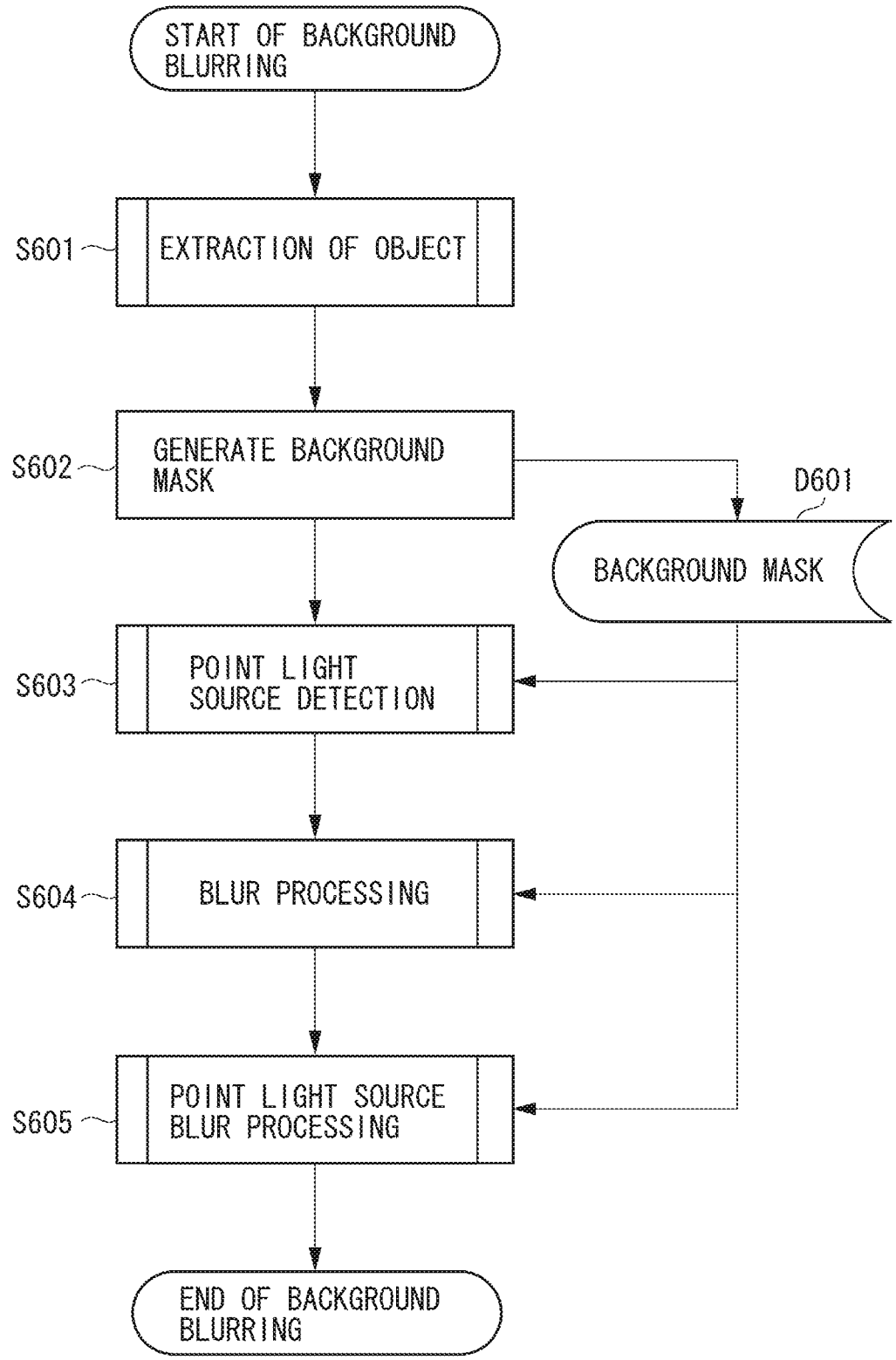

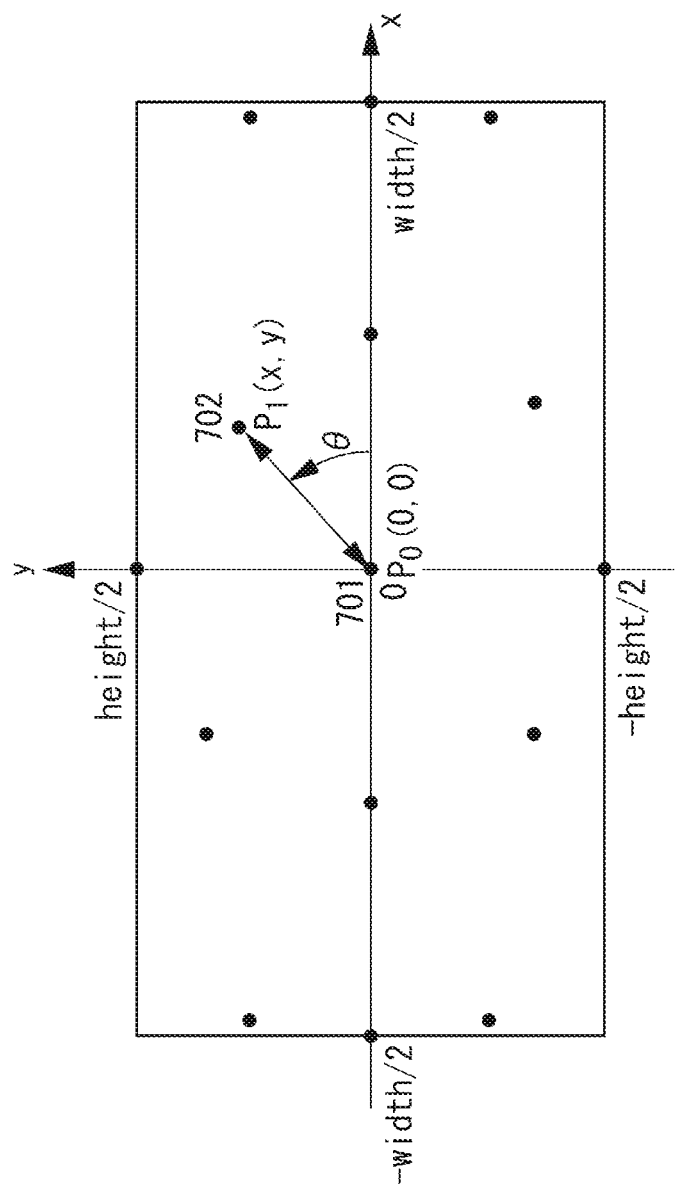

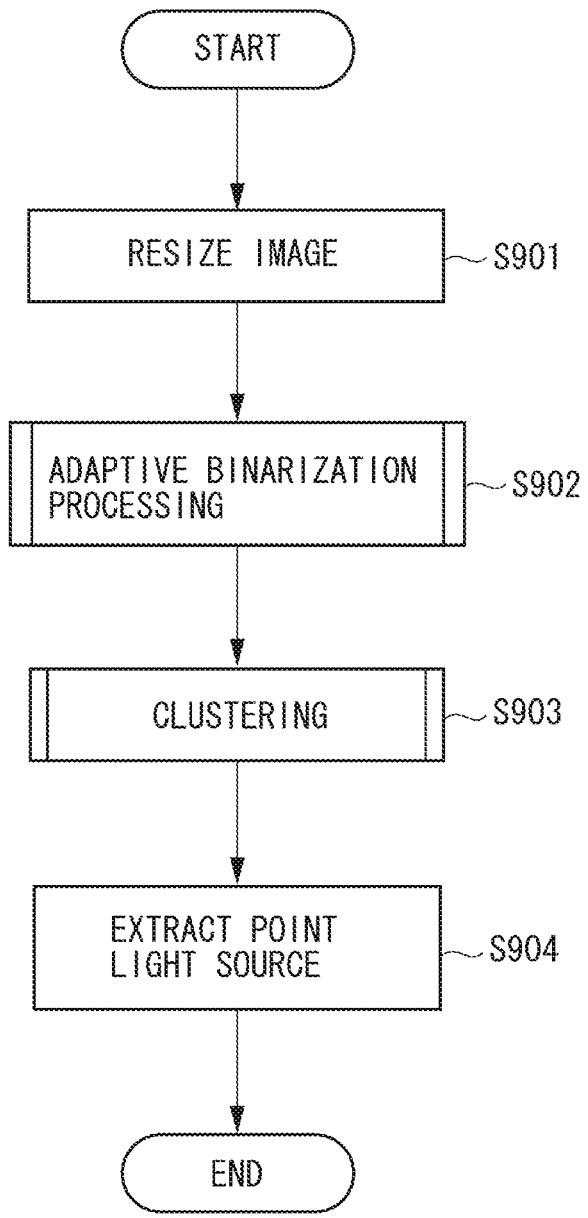

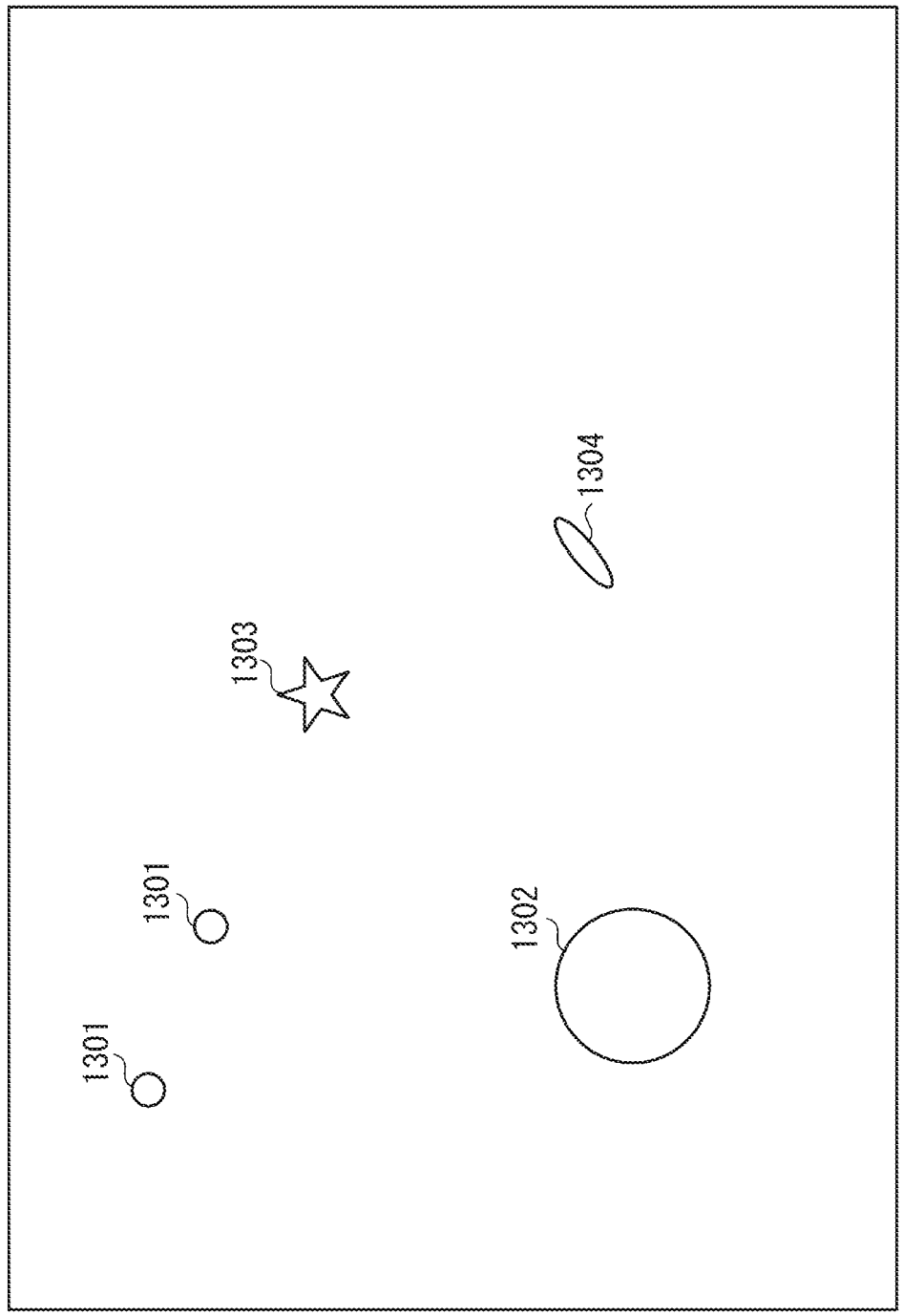

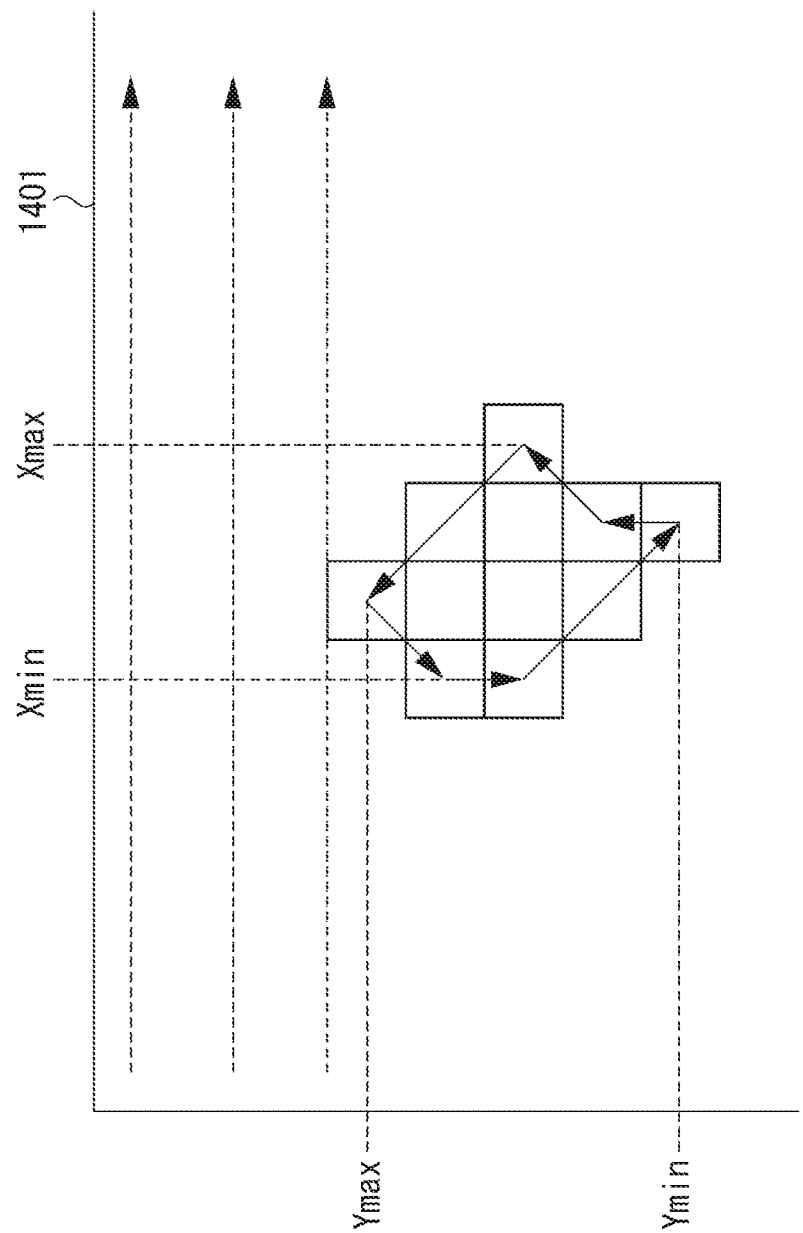

FIG. 14B

| REGION ID | REGION COORDINATES | | | | REGION CENTER POSITION | | PERIPHERAL LENGTH |
|---|---|---|---|---|---|---|---|
| | Xmin | Xmax | Ymin | Ymax | | | |
| 0 | Xmin0 | Xmax0 | Ymin0 | Ymax0 | Cx0 | Cy0 | Larr0 |
| 1 | Xmin1 | Xmax1 | Ymin1 | Ymax1 | Cx1 | Cy1 | Larr1 |
| ... | ... | ... | ... | ... | ... | ... | ... |

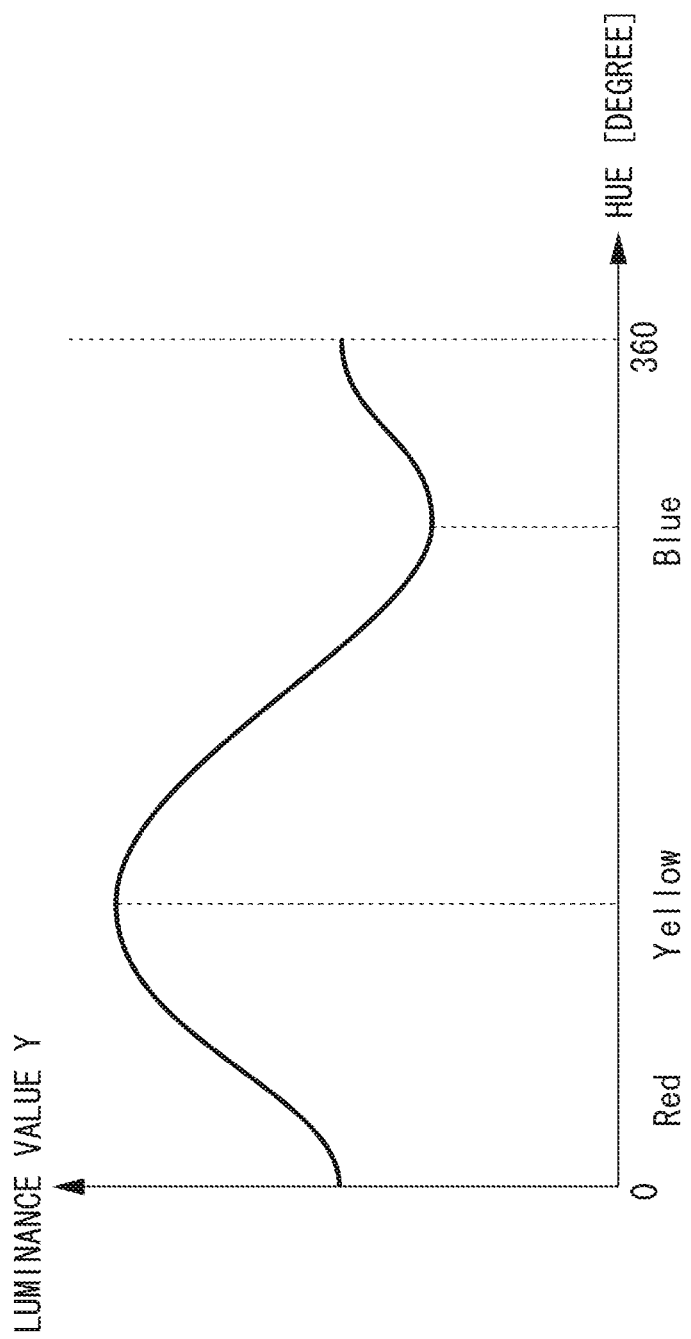

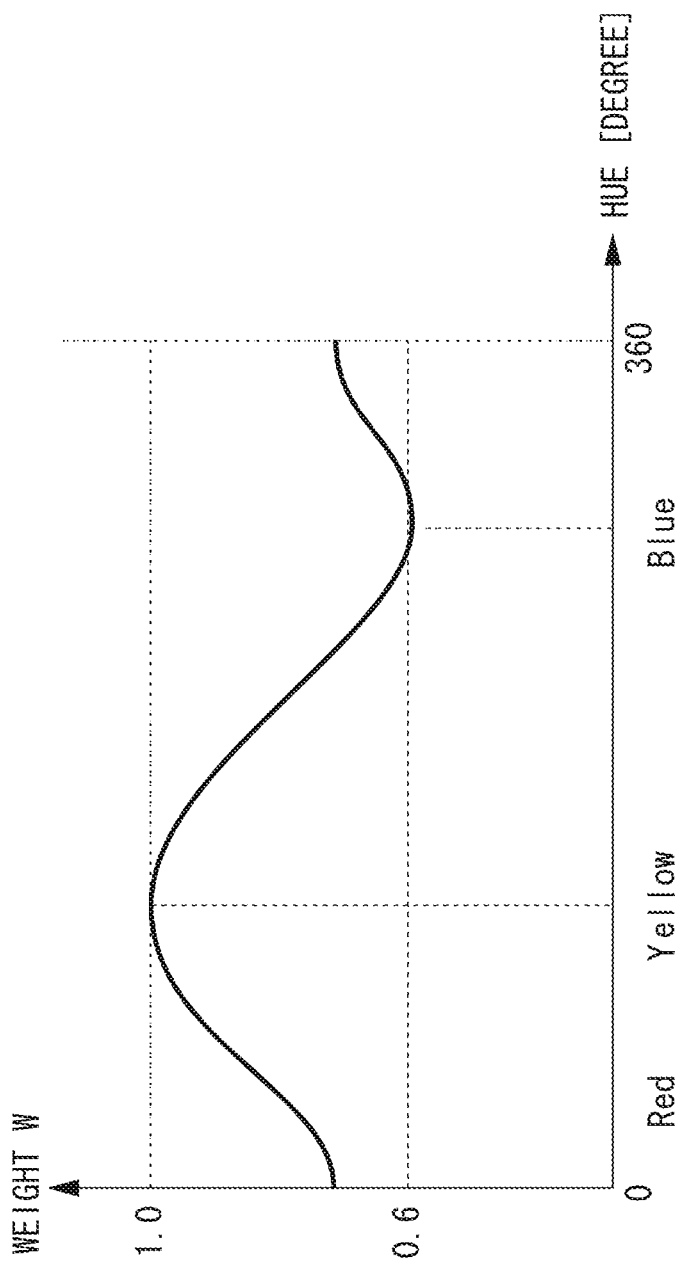

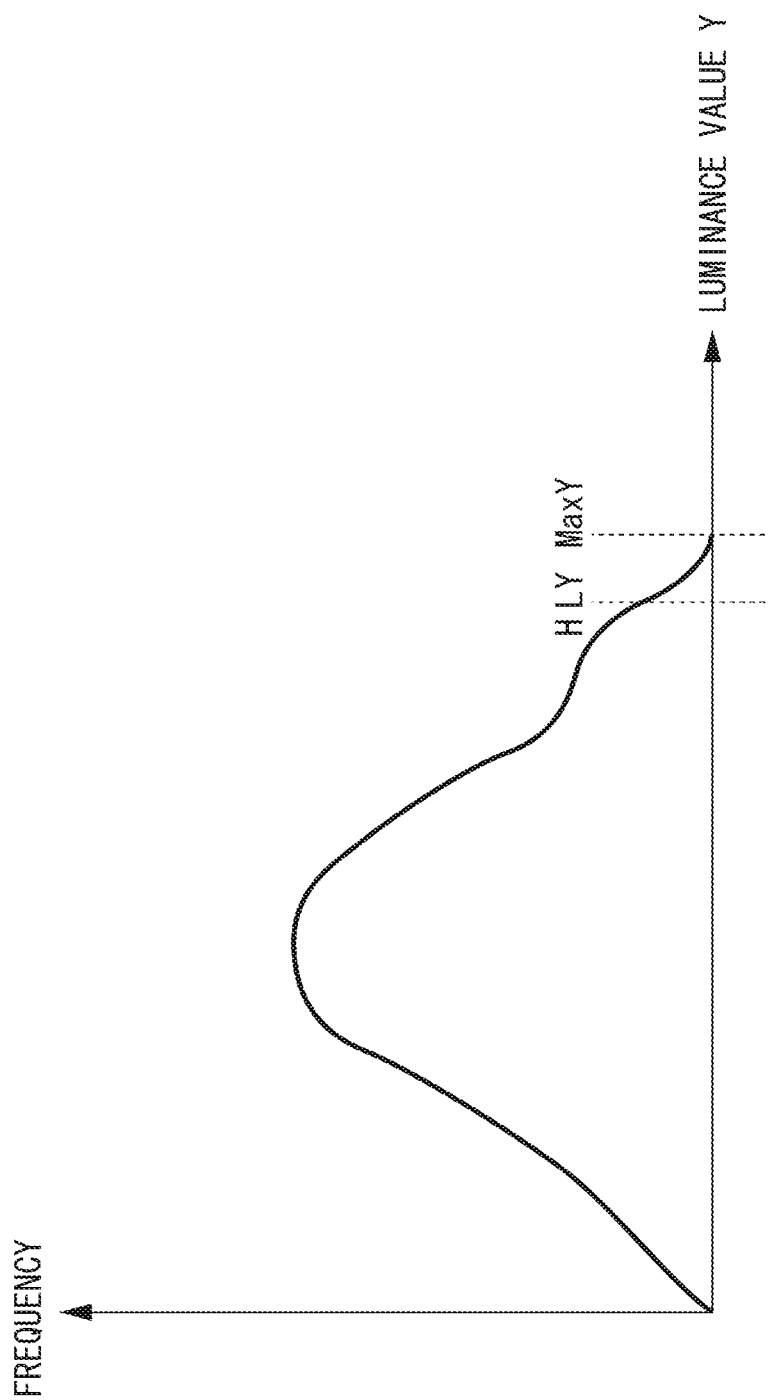

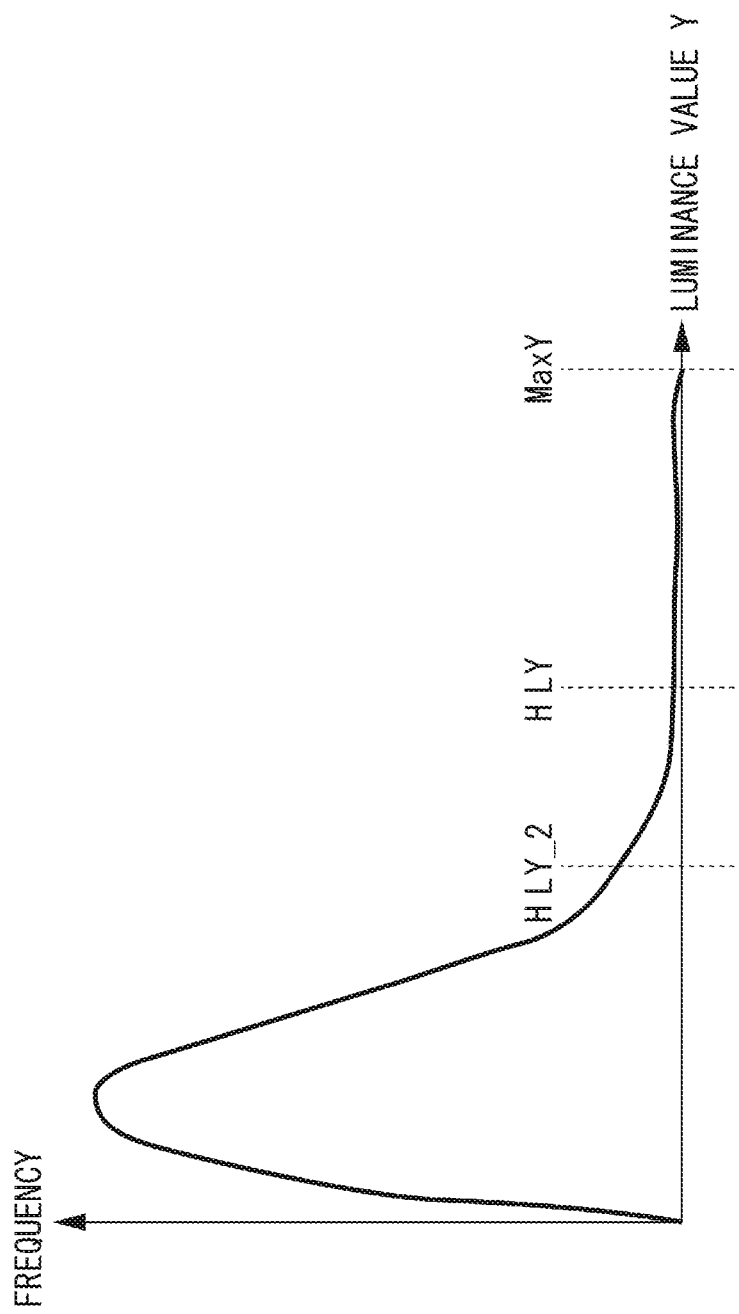

FIG. 18C

| SHOOTING SCENE | WEIGHT W |
|---|---|
| LANDSCAPE | 1.0 |
| NIGHTSCAPE | 0.8 |
| UNDEREXPOSURE | 0.6 |

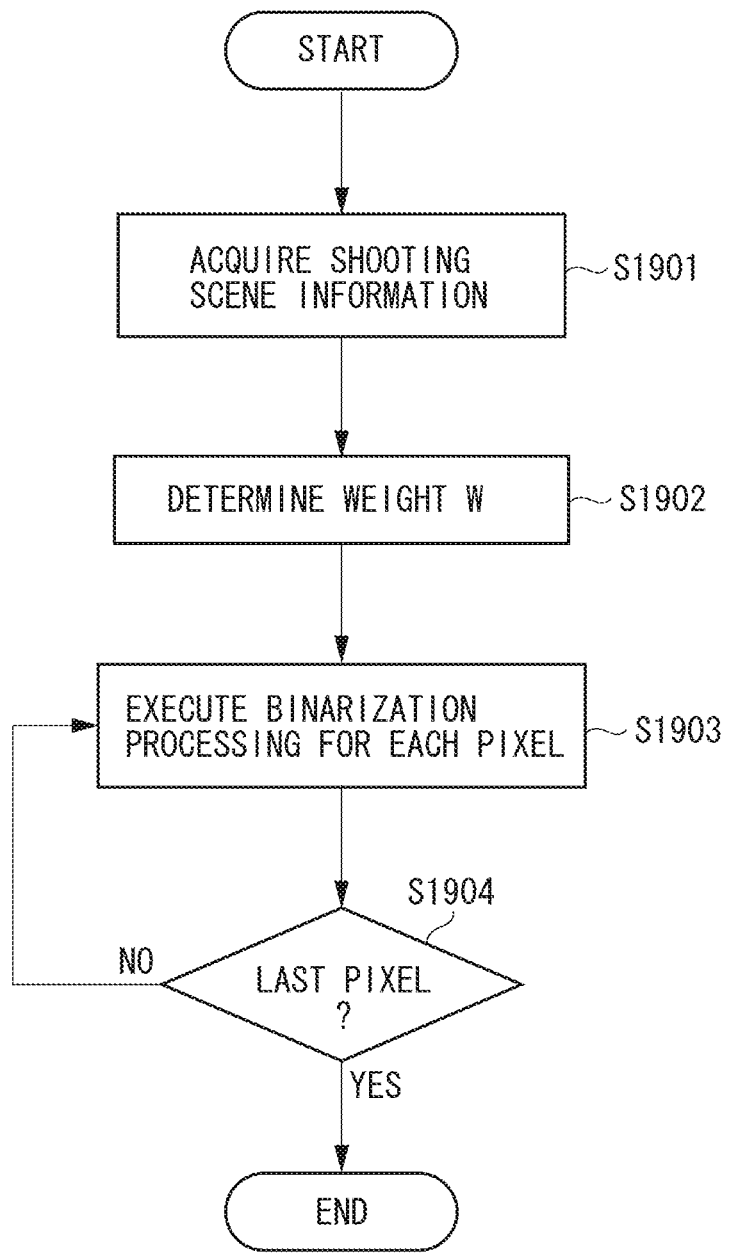

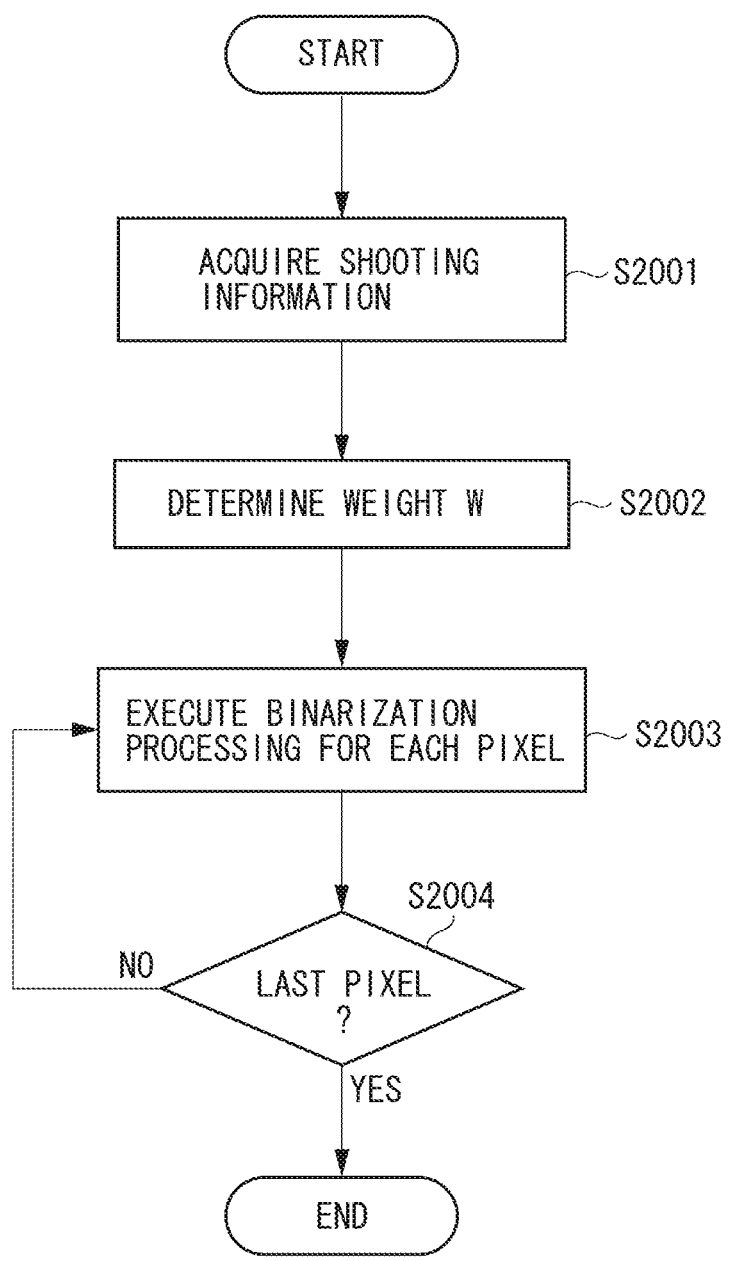

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus that performs predetermined processing for input image data, an image processing method, and a storage medium.

2. Description of the Related Art

There has conventionally been known a photographing method for blurring a background while focusing on a main object when photographing is carried out by a digital camera. This photographing method enables acquisition of an image of a dreamy effect by blurring a point light source to generate a circular bokeh in a portion corresponding to the point light source. Such a circular bokeh is generated by characteristics of a lens of the digital camera. The point light source is a region where there is local light of a certain size. Bokeh is a term of art commonly used to describe the aesthetic quality of a blur in out of focus areas of images.

There are known methods for fetching image data and processing it into an image where a circular bokeh has seemingly been generated (Japanese Patent Application Laid-Open Nos. 2009-003858 and 2009-218704).

Japanese Patent Application Laid-Open No. 2009-003858 discusses the method for changing a size or a shape of blurring when a light source region is blurred by selecting one of a plurality of filters prepared beforehand. Japanese Patent Application Laid-Open No. 2009-218704 discusses the method for emphasizing a high-luminance portion during background blur processing.

A circular bokeh region in an image actually captured by the digital camera varies with positions in an angle of view depending on optical characteristics of the lens. However, the methods discussed in Japanese Patent Application Laid-Open Nos. 2009-003858 and 2009-218704 perform uniform blur processing irrespective of positions in the image to be processed. In consequence, a blurred image that would be captured through the lens cannot be reproduced.

SUMMARY OF THE INVENTION

The present invention is directed to an image processing apparatus that is capable of acquiring a blurred image, which would be captured through a lens, by processing image data, an image processing method, and a storage medium.

According to an aspect of the present invention, an image processing apparatus includes an input unit configured to input image data, a detection unit configured to detect a region corresponding to local light in an image represented by the image data input by the input unit, and a processing unit configured to perform blur processing on the region corresponding to the local light and detected by the detection unit, wherein the processing unit varies, according to a position of the region corresponding to the local light and detected by the detection unit, an area on which to perform the blur processing.

According to an exemplary embodiment of the present invention, a blurred image that would be captured through the lens can be acquired by processing the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating processing of point light source detection.

FIG. 4 illustrates an imaging state of light that is input through a lens.

FIG. 6 is a flowchart of a background blur processing flow.

FIGS. 7A, 7B, 7C, and 7D illustrate examples of changing point light source blur shapes according to positions of point light sources.

FIG. 9 is a flowchart illustrating processing of point light source detection.

FIG. 13 illustrates a group of regions of point light source candidates in an image to be processed.

FIGS. 14A and 14B illustrate clustering processing performed by a boundary line tracking method.

FIGS. 16A and 16B illustrate weights according to hues.

FIGS. 18A, 18B, and 18C illustrate weights according to shooting scenes.

FIG. 19 is a flowchart illustrating processing of binarization.

FIG. 20 is a flowchart illustrating processing of binarization.

DESCRIPTION OF THE EMBODIMENTS

Various exemplary embodiments, features, and aspects of the invention will be described in detail below with reference to the drawings.

In the exemplary embodiments of the present invention, a point light source is also referred to as local light because an image corresponding to light having a certain size is within its category.

Figure 1:
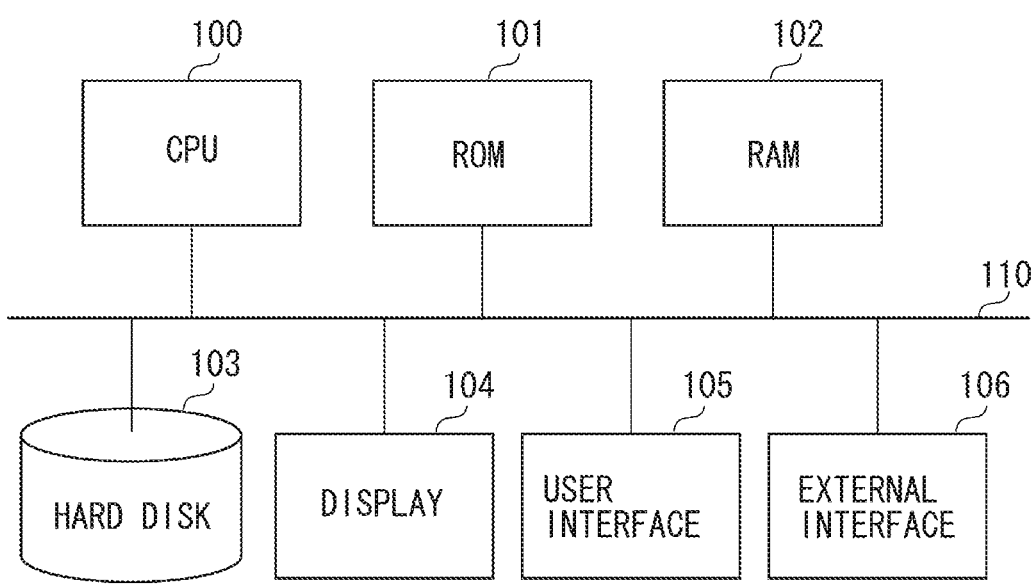
FIG. 1 is a block diagram illustrating a configuration of an image processing apparatus according to an exemplary embodiment.

FIG. 1 is a block diagram illustrating a hardware configuration example of an image processing apparatus according to a first exemplary embodiment. The image processing apparatus can be implemented, for example, by installing predetermined software on a general-purpose personal computer (PC). In FIG. 1, a central processing unit (CPU) 100 controls the image processing apparatus according to a program corresponding to processing of a flowchart described below. A read-only memory (ROM) 101 stores the program executed by the CPU 100. A random access memory (RAM) 102 temporarily stores various pieces of information or setting information regarding processing by the image processing apparatus during execution of the program by the CPU 100. A hard disk (HD) 103 is a non-transitory storage medium for storing image data (image file) to be processed and parameters for pattern identification. The HD 103 further stores a program corresponding to processing of a flowchart described below. A display 104 displays information to be presented to a user. A user interface (UI) 105 receives a user's operation. The UI 105 includes a pointing device, such as a mouse, and a keyboard. An external interface (I/F) 106 is provided for connecting external apparatuses to the image processing apparatus. The external apparatuses include an image scanner that reads an image on a document, a memory device that can store image data, and a digital camera that can capture an image. The image processing apparatus can acquire the image data to be processed via the external I/F 106. A control bus/data bus 110 connects each of the units to the CPU 100 to enable mutual communication.

Figure 2:
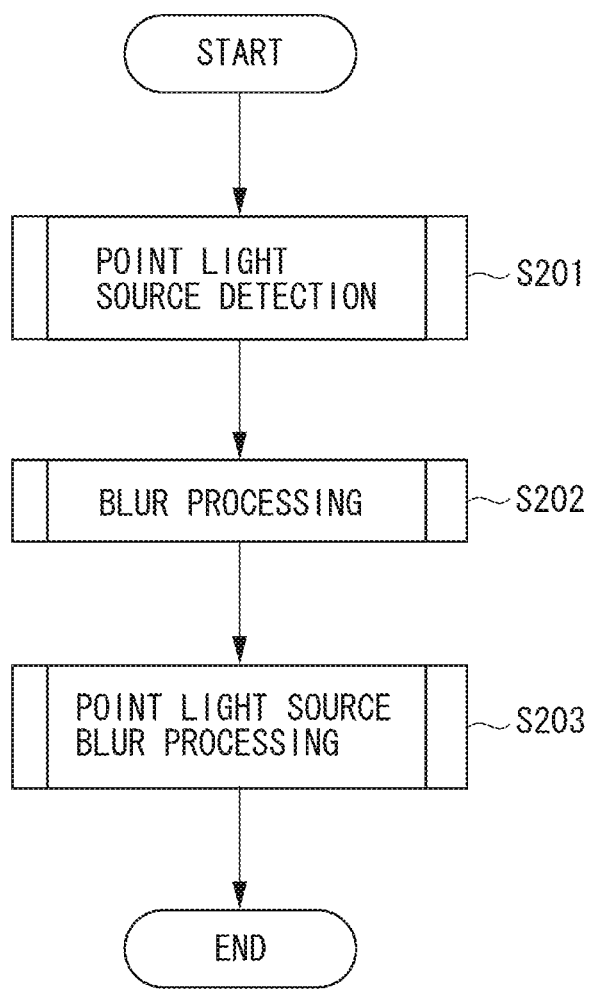
FIG. 2 is a flowchart illustrating processing according to the exemplary embodiment.

Next, blur processing to be performed on an image represented by the input image data in the image processing apparatus illustrated in FIG. 1 is described. FIG. 2 is a flowchart illustrating this blur processing. In the blur processing, a given object in the image is set in focus, and a background object is processed to be a blurred image. Point light source blur processing suited to blurring of a light source is executed for a place corresponding to the point light source included in the image. These processes are for reproducing a taste in a pseudo manner as if the image is actually captured through the lens of the camera. In the actual capturing of the image by the camera, when a focus is set on a main object to blur the background, an in-focus area is narrowed by opening a diaphragm wide and setting a depth of field to be small. Alternatively, a similar effect can be provided by using a telephoto lens or a macro lens. In this case, while a circular bokeh occurs in the point light source, in a region of this circular bokeh, luminance is higher in a surrounding portion than in the center of the region because of optical characteristics of the lens. In the processing described below, the image subjected to background blurring by such a photographing method is reproduced by processing the image data. The processing is carried out by loading the program stored in the ROM 101 or the HD 103 into the RAM 102 and executing the program by the CPU 100. The image data to be processed is fetched into the image processing apparatus via the external I/F 106 to be stored in the HD 103. Then, the user designates the image data via the UI 105, and instructs execution of blur processing to start processing shown in FIG. 2 and described below. As the image data to be processed, there are image data captured by a digital camera or a digital video camera, and image data acquired by reading an image captured by an analog camera through a scanner. For the image data to be processed, in addition to those acquired by these methods, image data captured by various other methods, such as that generated by an image processing application, can be used. The image represented by the image data to be processed includes at least one region equivalent to the point light source (not limited to a circle), and no circular bokeh is generated. Alternatively, when no excessively large circular bokeh is generated, an effect of processing described below is large.

First, in step S201, the CPU 100 detects a region corresponding to the point light source from the input image data. Image data to be processed is an entire image (angle of view) region represented by the input image data or an area of the image designated by the user. When the image data to be processed is printed, the image data may be an area to be printed. Then, in step S202, the CPU 100 performs blur processing on the input image data. For a blurring method in this case, a method that smoothes the image data is used. Specifically, low-pass filter processing by an average-value filter or a Gaussian filter, processing for converting the image data into a spatial frequency region to remove a high-frequency component, or processing for magnifying the image after its reduction is used. In this case, the CPU 100 carries out the blur processing for a background portion other than the point light source detected in step S201 and the main object. For identification of the background portion, an object present in the center is automatically detected as the main object, or an object designated by the user via the UI 105 is extracted as the main object, and the remaining part is treated as the background portion. Then, in step S202, the CPU 100 performs the blur processing on a portion acquired by removing the portion detected as the point light source from the background portion.

Then, in step S203, the CPU 100 performs light source blur processing on the point light source region detected in step S201. The point light source in this case means an image of light having a predetermined size and a luminance higher than that of the surroundings. When no point light source region is detected in step S201, the processing of step S203 is omitted.

Next, step S201 is described in detail with reference to FIG. 3. In the point light source processing, the CPU 100 detects an isolated light source region from the image data to be processed. First, to determine a light source, the CPU 100 defines a predetermined luminance threshold value Yth. As an example, the luminance threshold value Yth is set as a predetermined fixed luminance value. Pixels of interest are sequentially identified from the image data to be processed, and subjected to processing illustrated in FIG. 3.

In step S301, the CPU 100 determines whether the luminance of the pixel of interest is equal to or higher than the luminance threshold value Yth. When it is determined to be equal to or higher than the threshold value Yth (YES in step S301), then in step S302, the CPU 100 determines whether the pixel belongs to a flat region.

In step S302, a pixel which is included in a region that is composed of a pixel group of point light source candidates including the pixel and that is equal to or less than a predetermined size, and which has a difference from a luminance value of a surrounding pixel larger than a fixed value, is detected as a point light source region. Regions other than the point light source region are detected as flat regions. Then, a point light source region to be detected is circular, and values of a radius R of the point light source region and a luminance difference Ydiff from the surroundings are determined. In this case, in step S302, the CPU 100 acquires a luminance value Yorg of the pixel of interest and luminance values Yn (n is a value from 1 to 8) of pixels located away by a radius R in eight surrounding directions (vertical, horizontal, and diagonal from the pixel of interest). Positions of pixels to be compared can be predetermined according to a value of the radius R, or the number of pixels to be compared can be changed. When the pixels to be compared are pixels adjacent to each other, eight pixels of the vertical, horizontal and diagonal directions are determined for themselves. The processing is described on the assumption that the number of pixels to be compared is eight. The CPU 100 calculates luminance differences between the luminance value Yorg and the eight luminance values Yn. The CPU 100 determines that the pixel is within the flat region when there is even one luminance difference smaller than the luminance difference Ydiff, and determines otherwise when all the luminance differences are equal to or higher than the luminance difference Ydiff.

In step S303, the CPU 100 adds the pixel determined not to be a flat region in step S302 as a point light source to the detection result. The CPU 100 executes this processing for all the pixels in the image data to be processed. The point light source to be detected is circular in this case. However, other shapes such as a polygon can be employed. The positions of the surrounding pixels or the number of pixels to be compared in step S302 may vary depending on shapes of the point light sources.

In this processing, the image data to be processed can first be reduced to execute the aforementioned processing, and then enlarged to an original image size. In this case, one pixel determined to be a point light source when reduced is converted into a plurality of pixels by enlargement. This is applied to subsequent processing.

Next, step S203 is described in detail. A phenomenon that is a model of the point light source blur processing is described. FIG. 4 illustrates the occurrence of a circular bokeh in the point light source when an image is actually captured through the lens of the digital camera. In the illustration of FIG. 4, the digital camera, light incident on the digital camera, and the lens are simplified for ease of description.

In FIG. 4, light 405 enters from left to right, and there is an optical axis 401 in the center of the light 405. The normal light 405 that has entered the digital camera reaches an imaging plane (image sensor) 404 via a lens 403. The lens 403, which is assumed to be a spherical lens, is shown on a plane for simplicity. In this case, the description of processing is for light (light entering from the background) corresponding to the point light source, and thus the camera is out of focus on the imaging plane 404 (the focus is in front of the imaging plane 404) (while the camera is in focus on the object).

In this case, light 406 blocked by a diaphragm 402 among the light rays incident on the digital camera, which does not normally enter the lens 403, comes around to the back of the diaphragm 402 because of light characteristics, namely, a diffraction phenomenon, and passes through the lens 403 to reach the imaging plane 404. The light diffraction is a phenomenon where when it meets an obstacle, the light goes around to the back of the obstacle due to its wave nature. An image formed on the imaging plane 404 by such light diffraction is affected not only by the light 405 that has passed through the inside of the diaphragm 402 but also by the light 406 blocked by the diaphragm 402. Further, because this light is in the out-of focus state, light converged at one point is diffused to enter the imaging plane 404, and thus the influence of the light 405 becomes larger.

When this phenomenon occurs, as light entering the camera lens is stronger, the blocked light 406 is stronger, becoming conspicuous. Further, the blocked light 406 enters, as oblique light, the lens 403 with respect to the optical axis 401 by the diffraction. This causes shifting of a focus of the blocked light 406 in a direction away from the optical axis. Accordingly, when it enters the imaging plane 404, the light is combined with the normal light 405 to be imaged. As a result, in a circular bokeh of the point light source, luminance is higher in the outside (surrounding portion) than in the center.

When the point light source (background) is farther or the depth of field is smaller, a focus of the normal light 405 entering the imaging plane 404 is moved farther from the imaging plane 404. This causes enlargement of a bokeh generated by the light entering the imaging plane 404, and luminance is associatively reduced. The blocked light 406 and the normal light 405 enter the imaging plane 404 at different angles. Thus, when the focus is away from the imaging plane 404, the blocked light 406 is combined with the normal light 405 up to a predetermined distance, and changes to gradually converge at the edge of the normal light 405 as it approaches the predetermined distance. Beyond this distance, the blocked light 406 enters the imaging plane on the outside of the normal light 405, thus becoming light of ignorable intensity.

Thus, in the case of the light from the background having certain brightness or higher, which enters the camera lens, luminance is higher in the surrounding portion than that in the center because of the diffraction.

Thus, in the actual photographing through the lens, the phenomenon occurring for a circular bokeh of the point light source is used as the model, and the image data is processed to approach the phenomenon during the point light source blur processing.

Figure 5A:
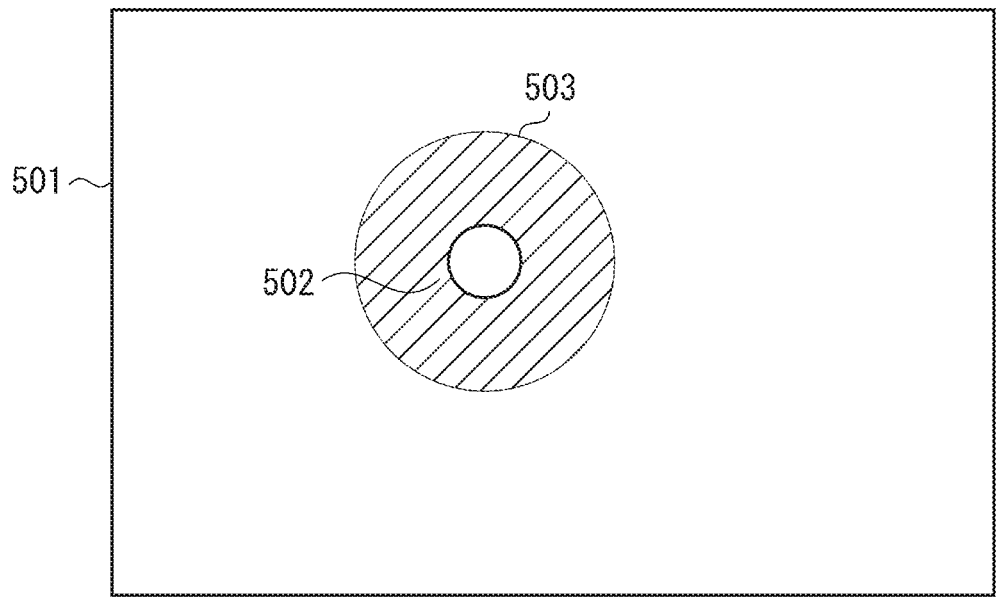
FIGS. 5A, 5B, and 5C illustrate point light source blur processing.

Referring to FIG. 5A, in an image region 501 to be processed, in the case of a point light source region 502 detected in step S201, an addition region 503, which is an enlarged region to surround the point light source region 502, is set around the point light source region 502. Then, the inside (including the point light source region 502) of the outer circumference of the addition region 503 is subjected to blur processing.

First, a reference addition luminance value is calculated based on an average luminance value among the pixels of the point light source region 502 or a luminance value of a pixel corresponding to the center point. Then, an addition region 503 wider than the point light source region 502 is determined from the size or the average luminance value of the point light source region 502 or blur intensity based on designation from the UI 105, and this is set as an addition region.

For the pixels located inside the addition region 503, a luminance value acquired by using an addition coefficient determined according to a distance from the center point is added to the predetermined addition luminance value. Output pixel luminance can be calculated by the following expression, where Yadd is an addition luminance value, k is an addition coefficient, Yorg is luminance of a pixel of interest, and Yout is output pixel luminance:

$$Yout=(1-k)\times Yorg+k\times Yadd \qquad (1)$$

In this case, the addition coefficient k is set so that the luminance in the outer circumference of the portion becoming a circular bokeh can be high as described above with reference to FIG. 4.

In order to limit the output luminance value within a specified area, clip processing for designating the specified area of the output luminance can be executed, and calculation can then be carried out to achieve an appropriate area.

The addition luminance value Yadd can be changed based on a size of the addition region 503. In this case, a predetermined reference area is determined, and the addition luminance value Yadd is set small when an area of the addition region 503 is larger than the reference area, and large when it is smaller.

The description has been directed to the calculation of the luminance value for each pixel. However, the processing can be carried out for a pixel value of each pixel. This enables blur processing of the point light source based on colors of the pixels in addition to the luminance. Hereinafter, as an example, a case of calculation (changing of pixel values) for pixels of color components including three primary colors, namely, red (R), green (G), and blue (B), is described.

As in the aforementioned case, a reference addition pixel value is calculated based on an average pixel value or a center point pixel value of the point light source region 502. Addition is carried out for the pixels inside the addition region 503 by using an addition coefficient. Output pixel values can be calculated by the following expressions, where Radd, Gadd, and Badd are addition pixel values, k is an addition coefficient, Rorg, Gorg, and Borg are pixel values of interest, and Rout, Gout, and Bout are output pixel values:

$$Rout = (1-k) \times Rorg + k \times Radd \quad (2)$$

$$Gout = (1-k) \times Gorg + k \times Gadd \quad (3)$$

$$Bout = (1-k) \times Borg + k \times Badd \quad (4)$$

In order to limit the output luminance value within a specified area, clip processing designating the specified area of the output luminance is executed, and calculation is then carried out to achieve an appropriate area. The addition pixel values Radd, Gadd, and Badd can be changed based on the size of the addition region 503. In this case, a predetermined reference area is determined, and the addition pixel values Radd, Gadd, and Badd are set small when the addition region 503 is larger than the reference area, and large when it is smaller.

Figure 5B:
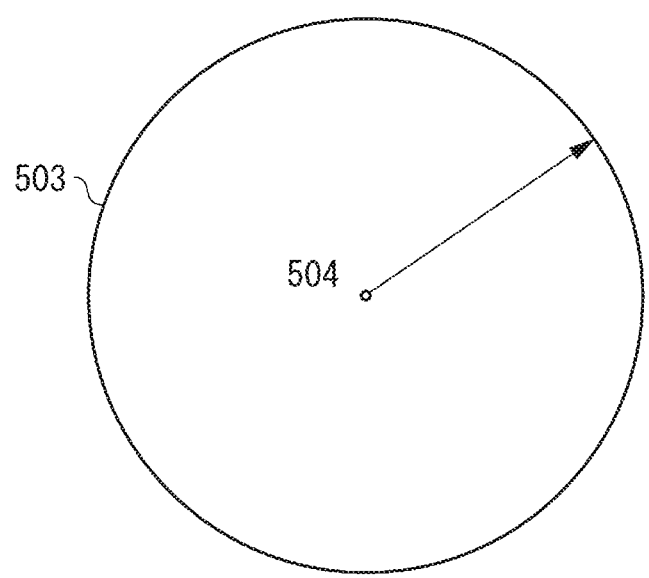
Figure 5C:
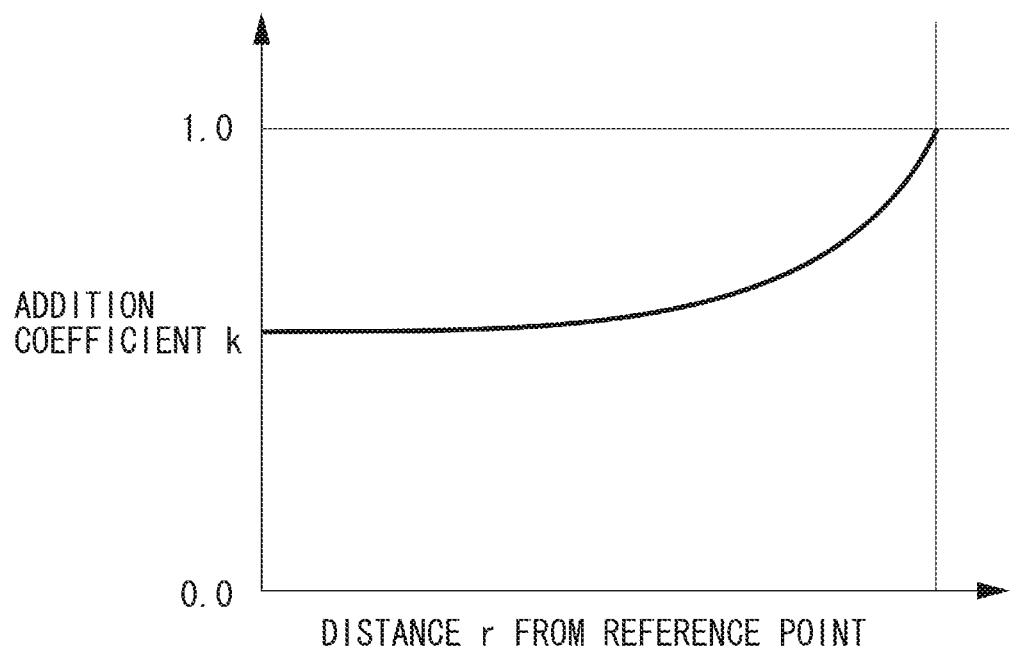

Next, referring to FIGS. 5B and 5C, an example of a determination method of the addition coefficient k used in the above-described calculation is described. The addition coefficient is determined by using quadratic functions described below, where k is an addition coefficient (k is a value from 0.0 to 1.0), r is a distance from the center 504 of the point light source, R is a radius from the center 504 to the outer circumference of the addition region 503, and a and b are given constants:

$$1.0 = a \times R^2 + b \quad (5)$$

$$1.0 \geq b \geq 0.0 \quad (6)$$

$$a \geq 0.0 \quad (7)$$

Based on these preconditions, the addition coefficient k can be calculated by the following expression:

$$k = a \times r^2 + b \quad (8)$$

The addition coefficient k can be changed based on the area of the addition region 503. In this case, a luminance difference between the center and the surrounding portion is set larger when the addition region 503 is wide than that when the addition region 503 is narrow. In such a case, a predetermined reference area Sbase is determined, and the constant b for the reference area is set to bbase, and then the state can be achieved by adding the following expression to the preconditions:

$$b = bbase \times S - Sbase \quad (9)$$

In this case, when b is larger than 1.0, clip processing may be carried out to set b to 1.0.

The determination method of the addition coefficient can be based on other than the quadratic functions. Other determination methods of the addition coefficient k can be used as long as a coefficient is higher near the surrounding portion than that at the center point 504 of the addition region 503, and the coefficient increases not in a linear shape but in a downward convex shape as illustrated in FIG. 5C. For example, the addition coefficient can be determined by using gamma used during gamma correction for displaying or printing or by creating a table where calculation results are prepared beforehand. This addition coefficient has a value based on characteristics in view of light diffraction. The addition region has been described to be circular. However, polygonal and other shapes can be employed. In such a case, the radius R of the addition region is located in an addition region farthest from the center point of the addition region. The center point of the circle has been set as a starting point of the addition coefficient. However, the starting point can be changed based on the shape of the addition region or a luminance distribution.

Depending on the point light source position and the size of the addition region, addition regions may overlap each other for a plurality of point light sources. In this case, the output pixel values can be calculated as described above, and the output pixel values can be compared with each other to output the higher one as an output pixel value. Alternatively, an average value among the output pixel values can be set as an output pixel value.

Thus, by changing the luminance value of the image data, the point light source blur processing when the image is captured through the lens can be reproduced more faithfully.

In the above-described processing, in step S201, the CPU 100 sequentially detects pixels determined to be point light sources. In this case, in step S203, when the surrounding pixels are point light sources, the point light source regions to be blurred can be processed as a set of point light source regions, or the pixels of the detected light sources can be processed one by one as separate point light source regions.

When the aforementioned processing (background blurring) is carried out, the camera is required to be focused on the main object. In other words, a specified object (main object) is required to be prevented from being blurred. In such a case, the blurring prevention can be easily and accurately achieved by the following procedure illustrated in FIG. 6.

In step S601, the CPU 100 extracts an object (object to be focused on) from the input image data, and separates the main object from the background. As a separation method, an image of interest can be displayed on the display 104, and the user can designate a region by using the UI 105, or the object can automatically be identified to be separated. In the case of automatic separation, the object can be identified by using information of image capturing conditions such as a depth of field added to the image data. When the user designates the region, the user designates it before the start of process illustrated in FIG. 6. To designate the region, a semiautomatic method can be employed: the user makes rough designation, and the CPU 100 detects an edge near the designated region, and then determines a final region.

After the separation of the main object from the background, the processing proceeds to step S602 to generate a background mask D601 for distinguishing the background from the main object. The background mask D601 identifies the background that is only the part left after removal of the main object extracted in step S601 from the image data to be processed (replaced with a state of no image). Then, the CPU 100 executes processing of steps S603 to S605 for the background mask D601. The processing of steps S603 to S605 is similar to that of steps S201 to S203. In this case, the processing of step S603 and subsequent steps can be executed only in pixels of a region corresponding to the background in the background mask D601, or for all the pixels. The position of the detected point light source and the background mask D601 can be compared with each other to execute processing of step S604 and subsequent steps for a region corresponding to the background. In step S605, for example, when the addition region 503 overlaps the main object region, only the overlapped portion can be subjected to addition processing.

Further, the pixel of the main object region can be excluded from calculation of an addition pixel value.

Then, after step S605, by returning the extracted main object, in the in-focus state on the main object, an image having a background portion subjected to blur processing can be acquired.

Thus, according to the present exemplary embodiment, by executing blurring so that luminance can be higher near the surrounding portion than near the center (to achieve a brighter image) when the light source region is blurred, in the digital image processing, a taste of an image actually captured through the lens can be reproduced.

In the case of capturing an image through the lens of a digital camera, when the camera is focused on the center of the angle of view to bur the background, the shape of a circular bokeh is made gradually flat farther from the center of the angle of view because of optical characteristics of the lens. A second exemplary embodiment is directed to processing for changing, in view of the optical characteristics of the lens, the shape of a blurred region during the execution of the processing of the first exemplary embodiment to a shape according to its position.

FIG. 7A illustrates the entire region of image data to be processed. In FIG. 7A, for description, a point of origin 701 is set at the center of an image represented by the image data, the y axis is set in a vertical direction through the point of origin, and the x axis is set in a horizontal direction. The image represented by the image data is represented by a height and a width, and the image data to be processed includes height× width pixels. Each pixel is presented by the following coordinates:

$$p(x,y)\{x|-width \leq x < width, y|-height/2 \leq y < height/2\} \quad (10)$$

The present exemplary embodiment is described by taking an example where the image of the image data to be processed has a horizontally long rectangular shape of height<width.

Black circle points illustrated in FIG. 7A indicate the pixels of the point light sources detected in step S201. FIG. 7A illustrates a state where a plurality of points including a point P0 (0, 0) 701 located at the center of the image and a point P1 (x, y) 702 are detected as point light sources.

A plurality of blurring masks different from one another in shape are separately used depending on how far positions of the detected point light source are located from the point of origin. In other words, the blurring mask near point of the origin has a shape close to a circle, and the blurring masks located farther from the point of origin have flat elliptic shapes. The blurring mask, which corresponds to the addition region 503 illustrated in FIG. 5A, is a region for acquiring a blurred image of the point light source by executing blur processing therein.

Figure 7B:
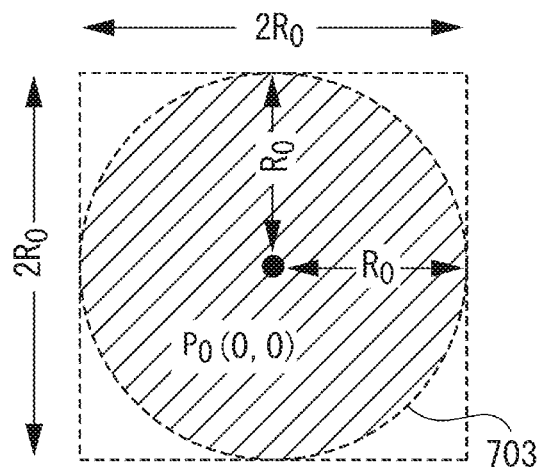

For blur correction at the point P0 (0, 0) 701, a blurring mask region 703 illustrated in FIG. 7B is used. Around the point P0 (0, 0) 701, a correction region of a size 2R0 is set. Pixels located within the area of a radius R0 from the point P0 (0, 0) 701 are corrected. According to the present exemplary embodiment, the shape of the mask region 703 in the center position of the image is circular. For the radius R0, an appropriate value can be designated as an initial value, and the degree of blurring is higher as the value is larger. In the present exemplary embodiment, the radius R0 has a fixed value that is 5% of the width of the image. The radius R0 can be varied depending on a user's designation. In this case, there is an effect of enabling the user to select a correction effect.

Figure 7C:
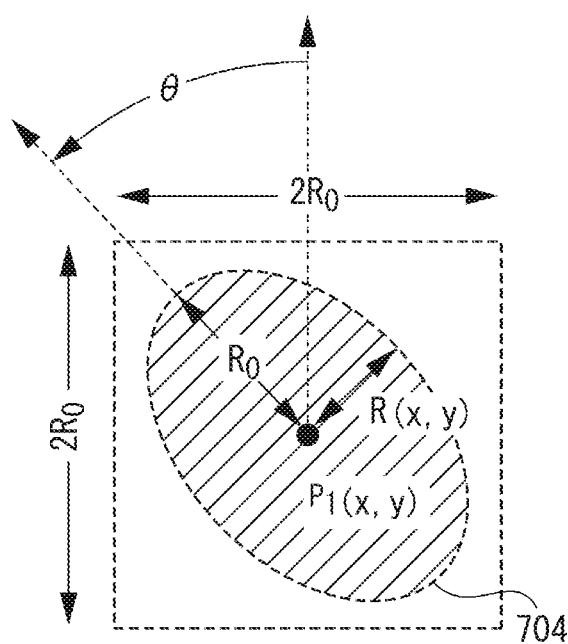

For blur correction at the point P1 (x, y) 702 located within an area away from the point of origin by a predetermined distance, a blurring mask region 704 illustrated in FIG. 7C is used. The blurring mask region illustrated in FIG. 7C changes according to the coordinates of the point P1 (x, y) 702. Control of the change is described below. The blurring mask region 704 is formed into an elliptic shape having a long side R0 and a short side R (x, y), and rotated by an angle θ°. The short side R (x, y) is defined as follows:

$$R(x,y) = R0 \times (width - (I/2))/width \quad (11)$$

$$\text{where } I = (x^2 + y^2)^{1/2} \quad (12)$$

θ: angle [°] between a straight line connecting the center point P0 (0, 0) 701 and the point P1 (x, y) and the x axis.

Figure 7D:
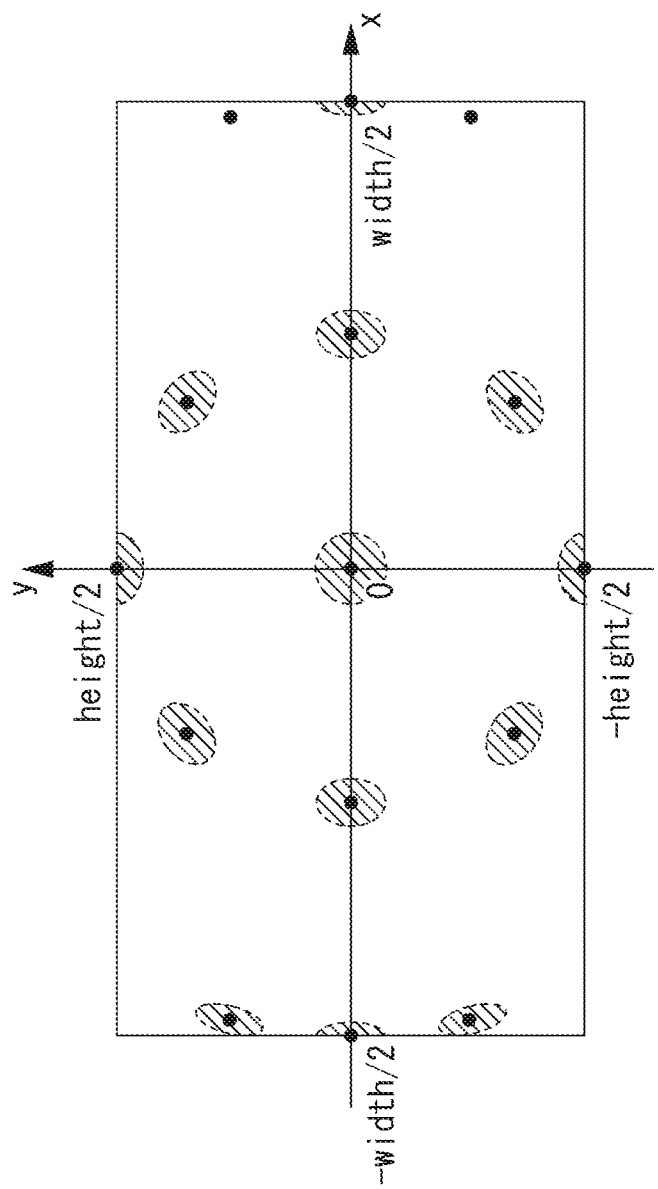

FIG. 7D illustrates the shape of the blurring mask region thus defined. Except for flattening of the addition region farther from the center, processing similar to that of the first exemplary embodiment is executed. As illustrated in FIG. 7D, a blurring effect closer to a circle is provided nearer the center, while a blurring effect of a flat shape is provided nearer the end. In other words, reproducibility of the image captured through the lens is improved by varying the area of executing blurring processing depending on the positions of the point light sources within the angle of view. Further, the flattening direction is rotated around the point of origin, and the blurred states of the point light sources according to the optical characteristics of the lens can be reproduced.

The second exemplary embodiment has been described by taking the example where the flattening and the rotation of the blurring mask region are controlled according to the coordinates of the point light sources. However, in an image actually captured through the lens of a digital camera, a blurred region is larger toward the end of the image. This is because the degree of blurring is higher farther from the center of the lens. Thus, according to a third exemplary embodiment, by executing, in addition to the control of the shape of the blurring mask region of the second exemplary embodiment, control to enlarge a size of the blurring mask region toward the end, a correction effect closer to the blurred image when the image is actually captured through the lens is provided.

Hereinafter, only differences from the second exemplary embodiment are described. Other portions are subjected to processing similar to that of the first and second exemplary embodiments.

According to the second exemplary embodiment, in FIG. 7C, the elliptic short side R (x, y) changes as a function of the coordinates p (x, y), while the long side R0 is fixed. According to the third exemplary embodiment, control is performed so that by acquiring an elliptic long side R' (x, y) as a function of coordinates p (x, y), a blurring mask region is enlarged at the end of the image. Accordingly, the long side R' (x, y) is defined as follows:

$$R'(x,y) = R0 \times \cos h(Z) \quad (13)$$

$$\text{where } Z = I/(width) \times \pi/2, \; I = (x^2 + y^2)^{1/2} \quad (14)$$

Figure 8A:
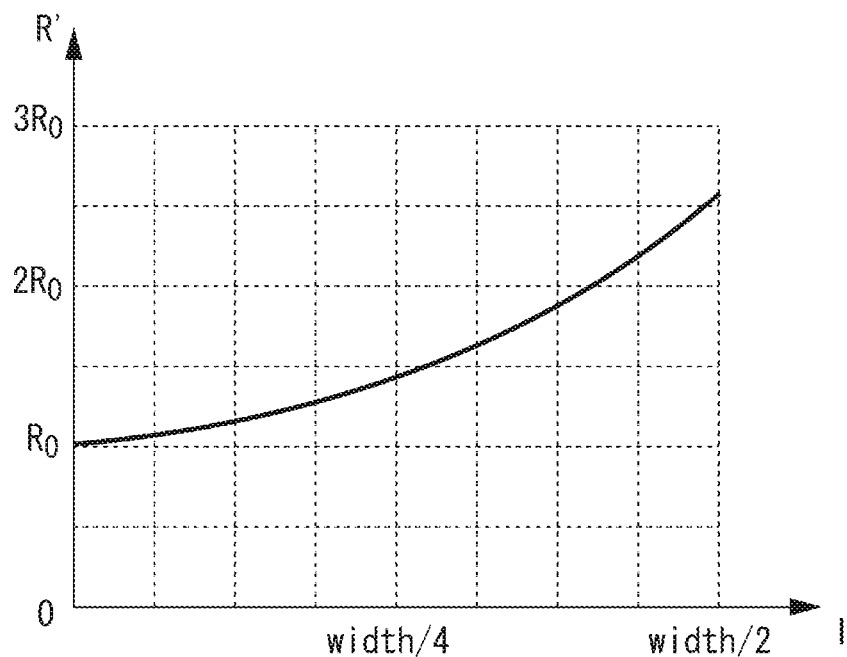
FIGS. 8A and 8B illustrate examples of changing point light source blur sizes according to the positions of the point light sources.

Thus, the long side R' becomes a monotonously increasing curve of a downward convex shape as illustrated in FIG. 8A, and its value is larger toward the end of the image.

Figure 8B:
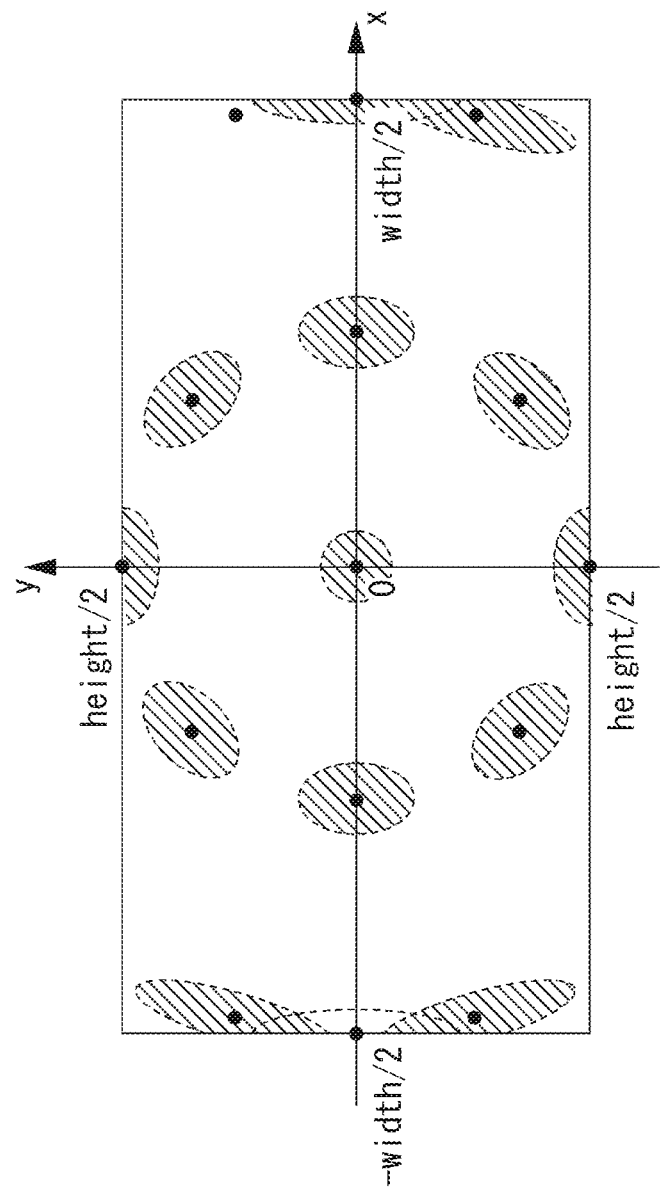

FIG. 8B illustrates a shape of the blurring mask region thus defined. As illustrated in FIG. 8B, a circular blurring effect is provided at the center, the shape is flatter toward the end and, while a flattening direction rotates around the point of origin as in the case of the second exemplary embodiment, the blurring mask region is larger toward the end. As a result, a blurred state more in view of optical characteristics of the lens than the second exemplary embodiment can be reproduced.

The hyperbolic function cos h ( ) is used as the function to control the long side R'. However, the present invention is not limited to this function. Any function can be used as long as it has characteristics of a gradual increase toward the end.

According to the third exemplary embodiment, the control to change the size is added to the control of the shape of the blurring mask region of the second exemplary embodiment. However, the blurring mask region can be determined only by the control to change the size (area) without changing the shape.

According to the above-described exemplary embodiments, the detection of the point light sources (steps S201 and S603) is executed by extracting those where the luminance value of the pixel of interest is higher by the predetermined threshold value or more than those of the surrounding pixels. In other words, the pixel (pixel group) much brighter than those of the surrounding pixels are detected as the point light sources. However, there can be various captured states for an image actually captured through the lens of a digital camera, and the point light sources may be different in characteristics according to the captured states. In a fourth exemplary embodiment, a method for improving detection accuracy of the point light sources is described.

Various conditions are conceivable for the captured state of the image. For example, there may be a difference in brightness of the point light sources between nightscape photographing and photographing under fine daylight. An image captured in an underexposure condition under the cloud has a low luminance value as a whole.

According to the fourth exemplary embodiment, characteristics of an image to be processed is analyzed, a captured state of the image is estimated based on the result of the analysis, and parameters are changed for detecting point light sources based on the result of the estimation, and a shape and a size of a region of point light source candidates are taken into consideration. The captured state is estimated from the analysis result of the characteristics of the image. In reality, the image to be processed may not be captured in the estimated state, or an image may be other than the image thus captured.

FIG. 9 is a flowchart illustrating point light source detection processing (steps S201 and S603) according to the fourth exemplary embodiment.

In step S901, the CPU 100 resizes input image data Iin (x, y) to be processed (a color image including R, G, and B pixel components), and acquires the resized image data Ire (x, y). In this case, x and y indicate coordinate positions on the image. When there is a plurality of sizes of the input image data (combination of vertical and horizontal sizes of the image represented by the image data), when a size of a point light source is determined in subsequent processing, the determination is required to be executed in view of a size of the original image. Accordingly, even when image data of any size is input, by resizing it to a predetermined size, control parameters in processing thereafter can be unified. During the resizing, pixel interpolation or pixel thinning is carried out. There is no restriction on a size after resizing. However, for example, the image is resized to a size unified based on the number of pixels such as 1600×1200 pixels. Without resizing, the input image data can be directly used to proceed to subsequent processing. When resizing is executed, there is no need to always set sizes after the resizing to be equal. The resizing can be limited to reduction processing (thinning), and the amount of image data to be processed can be decreased to reduce loads. Hereinafter, a case where the image data to be processed is resized to a predetermined size is described. The image data to be processed is multivalued image data for one pixel.

Figure 10:
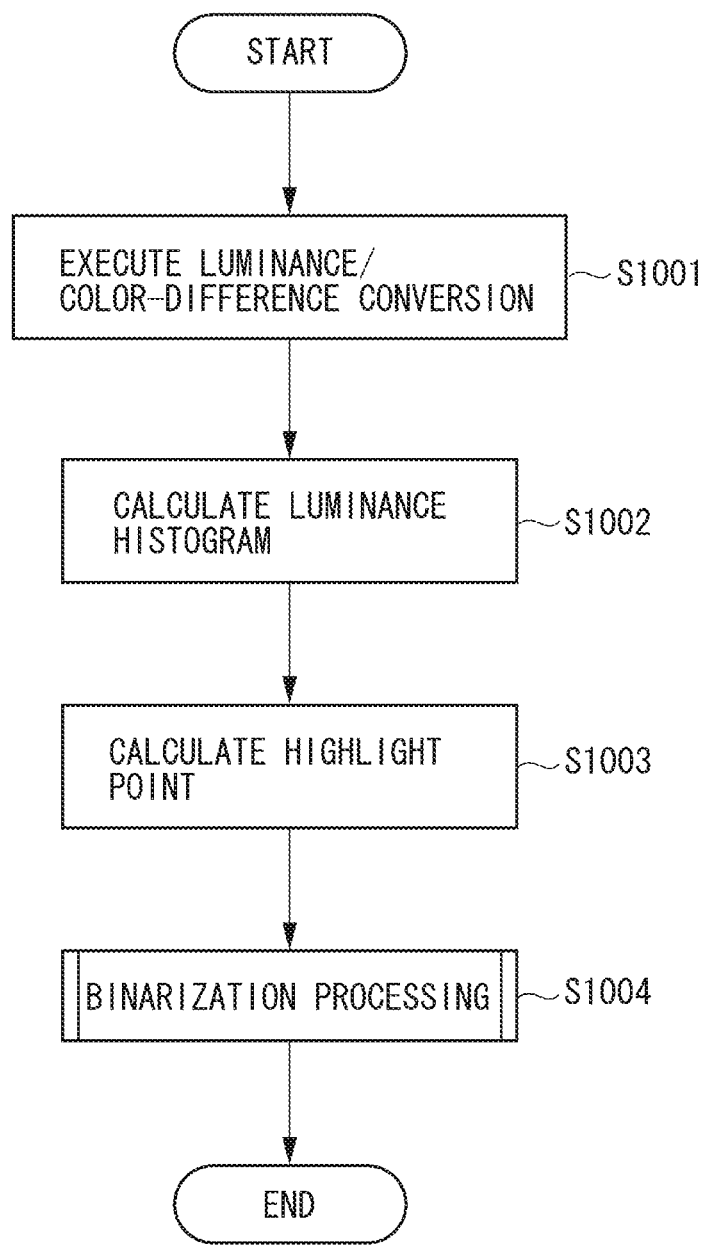
FIG. 10 is a flowchart illustrating processing of adaptive binarization.

In step S902, the CPU 100 executes adaptive binarization processing for the resized image data to be processed. FIG. 10 is a flowchart illustrating the processing of step S902 in detail.

In step S1001, the CPU 100 executes luminance/color-difference conversion for the input color image data by pixel units. Various luminance/color-difference components can be employed. In this case, a YCbCr component is converted, and an image after conversion is Irey (x, y). For this conversion, a well-known conversion method can be employed.

Figure 11:
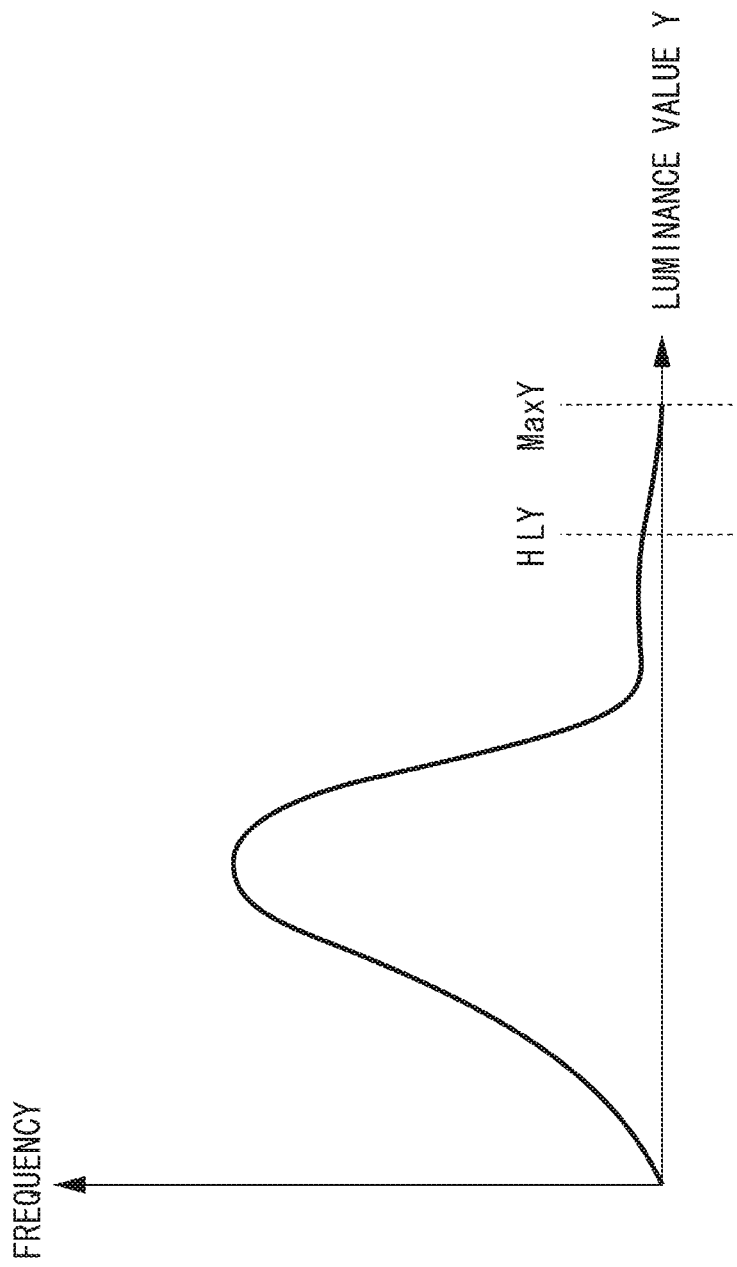
FIG. 11 is a histogram illustrating the number of pixels for each luminance value.

In step S1002, the CPU 100 calculates a histogram of a Y (luminance) component in the image Irey (x, y). FIG. 11 illustrates an example of the histogram calculated in step S1002, where the horizontal axis indicates a luminance value Y, and the vertical axis indicates a frequency (number of pixels).

Then, in step S1003, the CPU 100 calculates a highlight point. The highlight point is a high-luminance point where a cumulative frequency ratio of the histogram reaches a predetermined ratio (e.g., 97.0%), indicated by a value HLY illustrated in FIG. 11. A maximum luminance value in the image data to be processed is a value MaxY. The calculation of the highlight point is based on a statistical finding that there is a high possibility that regions of top and bottom several percentage in a frequency distribution are noise. Accordingly, a point light source threshold value described below is determined based on not the value MaxY but the value HLY. Thus, the CPU 100 executes appropriate point light source extraction by removing the influence of the high-luminance pixel having a possibility of noise in the image.

Figure 12:
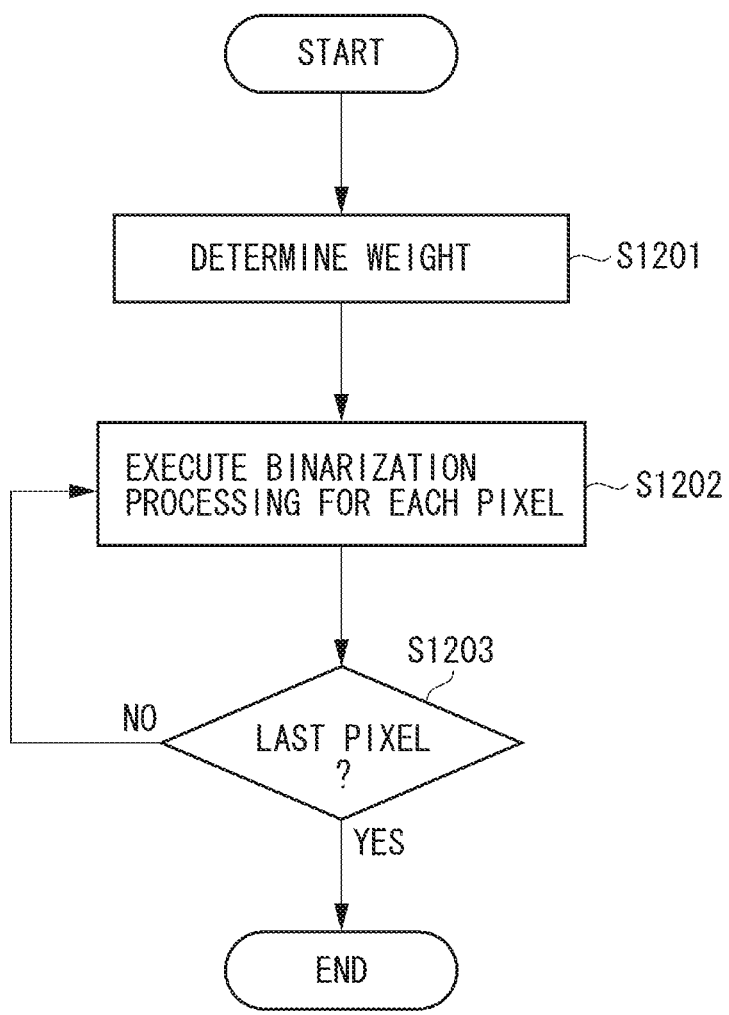
FIG. 12 is a flowchart illustrating processing of binarization.

Then, in step S1004, the CPU 100 sequentially executes binarization by the pixel units on the image Irey (x, y). FIG. 12 is a flowchart illustrating the binarization in step S1004 in detail. First, in step S1201, the CPU 100 determines a weight W. In subsequent binarization processing, a luminance threshold value ThY to determine 1 or 2 for binarization is determined as follows by using the weight W and the value HLY:

$$ThY = HLY \times W \tag{15}$$

The weight determined in step S1201 is a predetermined value in the present exemplary embodiment, for example, 0.9. After the determination of the weight W, in steps S1202 and S1203, the CPU 100 executes binarization processing for each pixel of the image Irey (x, y) according to the following condition to generate image data Ireb (x, y):

$Ireb(x,y)=1$ in the case of Y component of
$Irey(x,y) \geq ThY$, $Ireb(x,y)=0$ in the case of Y component of
$Irey(x,y) < ThY$ \tag{16}

FIG. 13 illustrates binarized image data Ireb (x, y) thus generated. In FIG. 13, a group of regions 1301 to 1304 is extracted as a region (highlight region) that is a group of high-luminance pixels. As illustrated, regions of various sizes and shapes are included.

Referring back to FIG. 9, in step S903, the CPU 100 executes clustering for the regions (1301 to 1304) present on the binarized image data Ireb (x, y). There is no restriction on a clustering method of the regions. A well-known method such as labeling processing can be used. In this case, the processing is described by using a boundary line tracking method having a limited calculation amount and capable of easily understanding the size or shape of a region.

FIGS. 14A and 14B illustrate the clustering executed by using the boundary line tracking method. FIG. 14A illustrates a part 1401 of the binarized image data Ireb (x, y). According to the boundary line tracking method of the present exemplary embodiment, first, the binarized image data is sequentially scanned from the left upper side to the right lower side, and the processing is temporarily stopped at a pixel where a value of the image data Ireb (x, y) is 1. Then, pixels present on the boundary of the regions are sequentially retrieved counterclockwise (or clockwise) and, when the processing returns to the temporarily stopped pixel, retrieval of one region is ended. During tracking of the boundary of this one region, maximum/minimum coordinate positions (Xmin or Xmax, or Ymin or Ymax) and a peripheral length Larr of the region are calculated. After acquisition of the maximum/minimum coordinate positions, a center position (Cx, Cy) of the region can be acquired as follows:

$$Cx=(Xmax+Xmin)/2, Cy=(Ymax+Ymin)/2 \quad (17)$$

After the end of retrieval of one region, the CPU 100 stores information indicating the result of the retrieval in the RAM 102, and starts horizontal scanning again to retrieve a next region. FIG. 14B illustrates storage of information acquired as a result of this processing corresponding to IDs allocated in order of regions to be retrieved. FIG. 14B illustrates symbols. In reality, coordinates or lengths are stored by numerical values.

Figure 15:
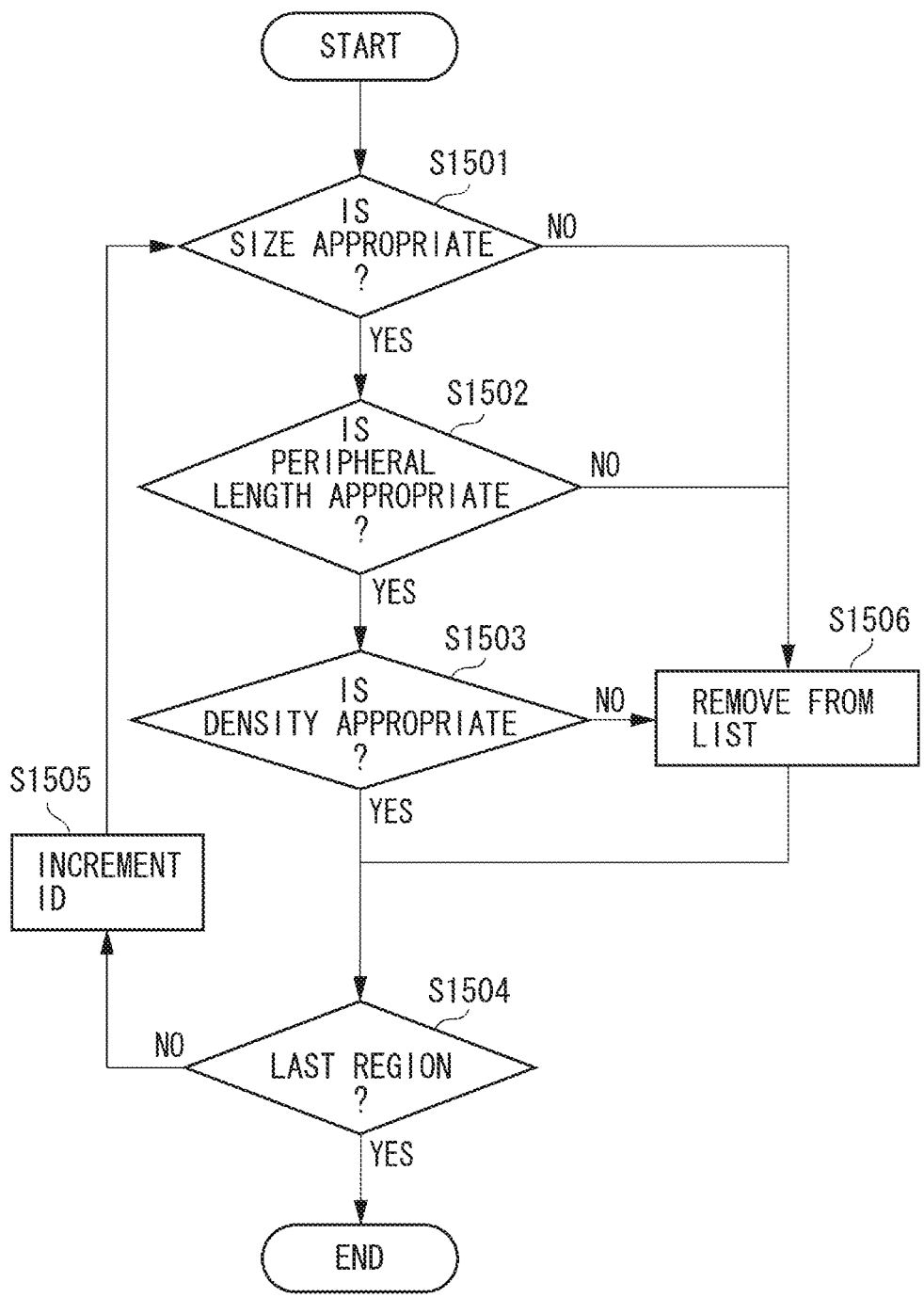
FIG. 15 is a flowchart illustrating processing of point light source extraction.

Then, in step S904, the CPU 100 extracts (identifies) a point light source by using clustering information such as a region ID or region coordinate information illustrated in FIG. 14B. FIG. 15 is a flowchart illustrating processing for extracting the point light source (determining the position of the point light source) in step S904.

First, in step S1501, for the area of ID=0, the CPU 100 determines whether a size of the region is appropriate. This determination is made according to the following expression:

$$(XmaxID-XminID) \leq ThSize \text{ and } (YmaxID-YminID) \leq ThSize \quad (18)$$

In the above expression, the predetermined threshold value ThSize indicating an upper limit of the size of the point light source is determined beforehand.

When it is determined that the expression is satisfied (YES in step S1501), the processing proceeds to step S1502 to determine whether a peripheral length of the region is appropriate (a length to become a point light source). This determination is made according to the following expression:

$$abs(LarrID-LrectID \times K) \leq ThArrL \quad (19)$$

In the above expression, the function abs ( ) is for acquiring an absolute value, and LrectID and K are calculated by the following expression:

$$LrectID=((XmaxID-XminID)+(YmaxID-YminID)) \times 2 \quad (20)$$

$$K=\pi/4=0.785 \quad (21)$$

By multiplying the peripheral length LrectID of a rectangle surrounding a region of interest in the expression by K, a peripheral length of a circle or an ellipse adjacent in the rectangle can be approximately calculated. When an absolute difference between the peripheral length and a peripheral length LarrID actually measured by the boundary line tracking method is larger than the predetermined threshold value ThArrL, there is a high possibility that the shape of a region of a point light source candidate may not be circular or elliptic but more complex. Accordingly, in step S1506, the CPU 100 removes this region from a point light source list.

Thus, for the region having a peripheral length determined to be appropriate (YES in step S1502), the processing proceeds to step S1503 to determine a density of the region.

In step S1503, the CPU 100 counts the number of pixels of "1" on the image data Ireb (x, y) for a rectangular region represented by the coordinates (Xmin, Ymin)–(Xmax, Ymax). The CPU 100 executes density determination in step S1503 by the following expression, where NumID is the count value:

$$abs(NumID-Sid) \leq ThNum \quad (22)$$

In the expression, the area Sid of the rectangular region is calculated by the following expression:

$$Sid=(XmaxID-XminID) \times (YmaxID-YminID) \quad (23)$$

When the area of the rectangle is compared with the pixel density, and a difference therebetween is equal to or more than a predetermined threshold value ThNum in the expression (22), this region is removed from the point light source list because of a high possibility that it may have a shape other than a circle.

Then, in step S1505, the CPU 100 increments the region ID until the last region is determined in step S1504. The processing in steps S1501 to S1503 is applied to all the point light source candidate regions. Accordingly, in FIG. 13, the region 1302 excessively large as a point light source, the region 1303 complex in shape, and the region 1304 low in density (excessively distorted in shape) are removed from the point light source list. As a result, the CPU 100 can extract (determine) only the region 1301 surely defined as a point light source candidate among the point light source candidates illustrated in FIG. 13.

Then, after the blur processing in step S202 illustrated in FIG. 2 or in step S604 illustrated in FIG. 6, the coordinate list of the extracted point light source region 1301 is input to the point light source blur processing in step S203 illustrated in FIG. 2 or in step S605 illustrated in FIG. 6, and the point light source processing is carried out. Other processes are similar to those of the above-described embodiments. However, when the resizing in step S901 is executed, the CPU 100 executes, after executing processing to return the size to the original image size, the processing in step S202 or step S604 and subsequent steps, or lastly returns the size to the original image size after executing the processing of step S202 or step S604 and subsequent steps in a resized state.

According to the present exemplary embodiment, a luminance level used to recognize a point light source candidate according to the luminance distribution of the image data to be processed is changed to determine a point light source region. In other words, an identification basis of point light source regions is changed according to the characteristics of the imaged data to be processed, and thus the point light sources can be appropriately detected according to the captured state of the image to be processed. Since the point light source region is determined among the point light source candidate regions according to the shape or size of the region, identification accuracy of the point light source region can be improved. A satisfactory effect can be expected even when only one of the processing to determine the point light source candidate according to the luminance distribution and the processing to determine the point light source region according to its shape or size is executed.

When, for example, a nightscape image is processed, illuminations of various colors can become point light sources. When such various light sources are extracted as point light sources, if a binarization threshold value used to list point light source candidates is fixed as in the case of the fourth exemplary embodiment, only point light sources near yellow of high luminance are extracted, while point light sources near blue are difficult to extract. Therefore, according to a fifth exemplary embodiment, the threshold value for executing the adaptive binarization processing in the fourth exemplary embodiment is varied from one pixel color to another to appropriately extract (determine) the point light sources of various colors.

FIG. 16A illustrates a relationship between a hue and a luminance value. In FIG. 16A, the horizontal axis indicates a hue, where colors change from red near a degree of 0 to yellow, green, and blue. The vertical axis in FIG. 16A indicates a luminance value Y. As illustrated in FIG. 16A, luminance values are highest near yellow, and lowest near blue. According to the present exemplary embodiment, a threshold value for adaptive binarization processing is determined for each color in view of this relationship. Specifically, as illustrated in FIG. 16B, a weight W is varied from one color to another according to the relationship between the hue and the luminance value illustrated in FIG. 16A, and binarization is executed by using, as a binarization threshold value, a value acquired by multiplying the threshold value in the fourth exemplary embodiment by the weight W illustrated in FIG. 16B for each color represented by a pixel of interest. Values indicating the relationship between the hue and the weight W illustrated in FIG. 16B are stored as a table in the HD 103. Hue intervals in this table are appropriately determined based on the gradation of an image to be processed, or fixed. As illustrated in FIG. 16B, the weights W are set to be large near yellow and small near blue. A luminance difference is absorbed in originally present colors, and both can be similarly extracted as point light sources.

Figure 17:
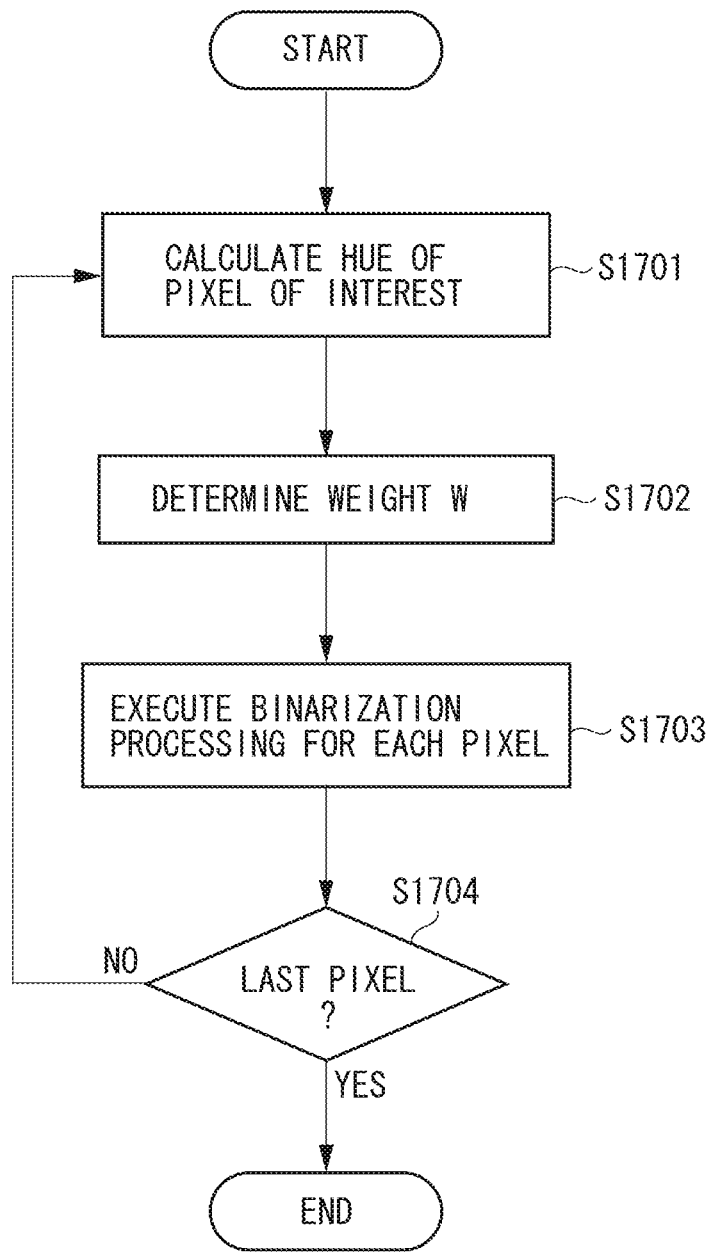
FIG. 17 is a flowchart illustrating processing of binarization.

FIG. 17 is a flowchart illustrating adaptive binarization processing according to the present exemplary embodiment. This flowchart concerns the processing in step S1004 illustrated in FIG. 10.

In step S1701, the CPU 100 calculates a hue of a pixel Ire (x, y) of interest to be processed this time in the image data to be processed. A well-known calculation method can be used for this calculation. In step S1702, the CPU 100 refers to the corresponding table illustrated in FIG. 16B, and determines a weight W corresponding to the hue of the pixel of interest based on the reference result.

In step S1703, the CPU 100 carries out binarization processing according to the expression (16). The CPU 100 then executes the processing in steps S1701 to S1703 until binarization is carried out for all the pixels to be processed. Other processes are as described in the fourth exemplary embodiment, and the description thereof is omitted.

Thus, according to the present exemplary embodiment, point light sources can appropriately be determined even in a nightscape image where there are point light sources of various colors.

Concerning images captured by a digital camera, there can be images captured under various environments. For example, there are a landscape image captured under fine daylight, a nightscape image where neon lights are brightly lit, and an image captured in underexposure under the cloud. Characteristics of point light sources may vary under various photographing environments. When binarization is carried out according to a fixed threshold value as in the case of the fourth exemplary embodiment, the point light sources may not be appropriately determined.

According to a sixth exemplary embodiment, in the adaptive binarization processing in the fourth exemplary embodiment, for images corresponding to such various photographing environments, the point light sources can be appropriately determined by varying a threshold value for binarization according to their characteristics. According to the present exemplary embodiment, when step S902 illustrated in FIG. 9 is executed, a shooting scene of an image to be processed is determined, and a weight W is determined to vary the threshold value for binarization according to the determination result.

FIG. 18A illustrates a luminance histogram of a typical sample of an image captured under fine daylight. FIG. 18B illustrates a luminance histogram of a typical sample of an image captured at a nightscape scene. In these histograms, as in the case of the fourth exemplary embodiment, a position where a cumulative frequency ratio is a predetermined ratio (e.g., 97.0%) is HLY. When point light sources are extracted with this position HLY as a basic axis, a light amount is sufficient during photographing under daylight, and thus there is a high probability that contrast of the image is appropriate. The detected position HLY can be directly used as a threshold value. On the other hand, in the case of a nightscape scene illustrated in FIG. 18B, when the position HLY identified at a fixed ratio is a threshold value, the luminance value of the position HLY is high with respect to a point light source threshold value HLY_2 to be originally extracted, creating a possibility that only some of point light sources actually present in the image may be extracted. In view of this state, more appropriate point light source extraction processing can be carried out by adaptively controlling a binarization threshold for extracting the point light sources according to a type of a shooting scene. Thus, according to the present exemplary embodiment, the weight W is varied according to a luminance distribution of each shooting scene as illustrated in FIG. 18C. In this case, for example, the shooting scenes are classified into three. The weights W are stored in the HD 103 in association with the shooting scenes. These weights W satisfy the following relationship:

$$\text{landscape} > \text{nightscape} > \text{underexposure} \qquad (24)$$

The three patterns have been described as the shooting scenes. Not limited to these patterns, however, various shooting patterns can be employed.

FIG. 19 is a flowchart illustrating adaptive binarization processing according to the present exemplary embodiment. This flowchart concerns the processing in step S1004 illustrated in FIG. 10.

First, in step S1901, the CPU 100 acquires shooting scene information of an image to be processed. For the shooting scene acquired in this case, photographing information accompanying input image data can be used, or the shooting scene can be estimated by analyzing a feature amount of the image. In the former case, for example, in the case of an image file compliant with the Exchangeable Image File Format (Exif) Standard, photographing information when the image is captured by a digital camera can be written as a tag in the image file. Thus, the information is read from the image file to be acquired. In the latter case, for example, methods discussed in Japanese Patent Application Laid-Open Nos. 2011-10162, 2010-273144, and 2010-251999 can be used. In other words, to estimate a shooting scene, a feature amount vector is formed by calculating a plurality of types of feature amounts from the image to be processed. The feature amount vector is then compared with a database stored beforehand by learning for various scenes to estimate at what scene the input image has been captured. In step S1901, it is enough if the shooting scent can be estimated. Thus, actual creation of a histogram can be omitted.

In step S1902, the CPU 100 determines a weight W according to the acquired shooting scene. In step S1903, the CPU 100 executes binarization processing by using the weight W according to the expression (16). Then, in step S1904, the CPU 100 sequentially executes binarization processing for all the pixels until the last pixel is determined.

Thus, according to the present exemplary embodiment, since the threshold value is set according to the characteristics of the image based on the shooting scene to detect the point light sources, appropriate detection according to the shooting scene can be carried out. In this case, the threshold value is determined by identifying the shooting scene. As a result, processing loads are not increased so greatly.

As the example of parameter control for point light source extraction according to the shooting scene, the method for changing the weight W has been described. However, other methods can be employed. For example, by adjusting the cumulative frequency ratio of HLY for each shooting scene, a similar effect can be provided by using it as a threshold value. Other methods can be used.

The sixth embodiment has been described by taking the example where by identifying the information of the shooting scene of the image to be processed, the information is reflected on the parameters for detecting the point light sources. In photographing by a digital camera, an image can be captured while changing an imaging sensitivity (ISO sensitivity). ISO sensitivities may take values from 50 to several hundred thousands, and a higher value means that an image has been captured in the state of a higher sensor sensitivity. When an imaging sensitivity is high, a luminance value is very high even with a small amount of light, and thus a binarization threshold value for point light source detection is required to be set high. In the case of a low imaging sensitivity state, it is equivalent to a state where the overall amount of light has been lowered, and thus the binarization threshold value is required to be set low.

Therefore, according to a seventh exemplary embodiment, when an image to be processed is an image captured by a digital camera, information of an ISO sensitivity at the capturing time of the image is acquired, and a threshold value for adaptive binarization processing to detect point light sources is changed according to the information. This enables appropriate detection of the point light sources.

FIG. 20 is a flowchart illustrating adaptive binarization processing according to the present exemplary embodiment. This flowchart concerns the processing in step S1004 illustrated in FIG. 10.

In step S2001, the CPU 100 acquires photographing information from image data to be processed. When the image data to be processed is compliant with the Exif Standard, imaging sensitivity information may contain ISO Speed Rate as a tag. In this case, the CPU 100 acquires this value.

Then, in step S2002, the CPU 100 determines the weight W according to the acquired ISO sensitivity. In the present exemplary embodiment, the CPU 100 acquires the weight W as follows.

Figure 21:
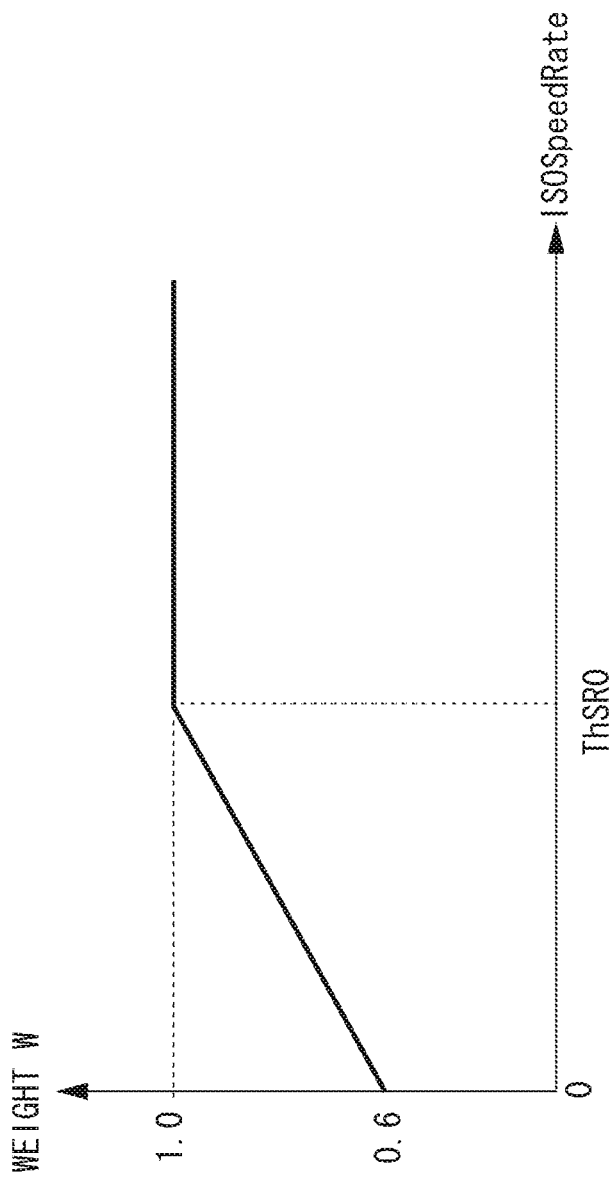
FIG. 21 illustrates weights according to International Organization for Standardization (ISO) sensitivities.

FIG. 21 illustrates a relationship between a value of the ISO sensitivity (ISO Speed Rate) and the corresponding weight W. As illustrated in FIG. 21, when the ISO sensitivity is lower than a predetermined value ThSR0, the weight W increases as the ISO sensitivity becomes larger, and W=1.0 is reached at the time of ThSR0. This relationship is stored as a table in the HD 103. In step S2002, the CPU 100 refers to the table to determine the weight W corresponding to the photographing information acquired in step S2001. In step S2003, the CPU 100 executes binarization processing by using the weight W according to the expression (16). The CPU 100 sequentially carries out binarization processing for all the pixels until the last pixel is determined in step S2004.

As described above, according to the present exemplary embodiment, the point light sources can be appropriately detected according to the imaging sensitivity during capturing of the image to be processed. In this case, processing loads do not increase because information accompanying the image file to be processed is used.

As the example of parameter control for point light source extraction according to the shooting scene, the method for changing the weight W has been described. However, other methods can be employed. For example, by adjusting the cumulative frequency ratio of HLY according to the imaging sensitivity, a similar effect can be provided by using it as a threshold value. Other methods can be used.

In photographing by a digital camera, a diaphragm may be adjusted manually or automatically to adjust the amount of light to reach the sensor. This diaphragm level is represented by an F-number.

A smaller F-number means that the diaphragm is in a more open state. In this case, a captured image is set in a state where a depth of field is small. In the state of the small depth of field, the background is blurred while only the main object is set in focus during photographing, and thus the point light source is greatly blurred according to a shape of the diaphragm. Conversely, when the F-number is large, the captured image is set in a state where the depth of field is large. When the depth of field is large, a wide area from the main object to the background during photographing is set in focus, and thus the point light source of the background is kept small.

Therefore, according to an eighth exemplary embodiment, a change of a size of the point light source of the background made depending on the state of the diaphragm during photographing is taken into consideration, and is reflected on determination of a size in step S1501 illustrated in FIG. 15. According to the present exemplary embodiment, the CPU 100 changes the size threshold value ThSize, which is used for setting a point light source candidate in step S1501, according to the F-number.

Figure 22:
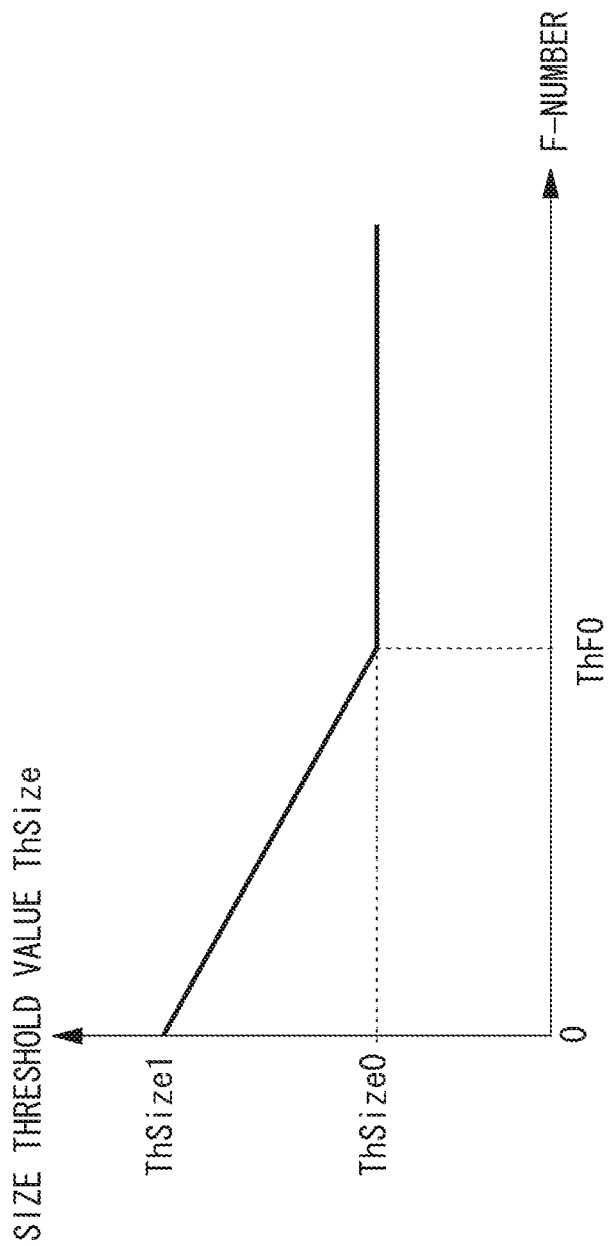
FIG. 22 illustrates a size threshold value according to an F-number.

FIG. 22 illustrates a relationship between the F-number and the size threshold value ThSize. When the F-number is smaller than a predetermined value ThF0, namely, when the depth of field is small, the threshold value is increased and, when the F-number increases, the threshold value decreases. When the F-number is larger than the predetermined value ThF0, the depth of field is sufficiently large, and thus the threshold value is kept fixed.

As described above in the sixth and seventh exemplary embodiments, some image data compliant with the Exif Standard may include F-numbers written as tags. Accordingly, the CPU 100 identifies the size threshold value ThSize according to an F-number identified by referring to F-numbers accompanying the image data to be processed to execute the processing illustrated in FIG. 15.

Thus, by referring to the F-number to estimate the depth of field of an image and adaptively dealing with the size of a point light source present on the background, the point light source can be appropriately determined even when the state of the depth of field changes.

The processes in the above-described exemplary embodiments can be appropriately combined or partially changed. The processes in the exemplary embodiments can be performed not only by a personal computer (PC) but also by a digital camera or a printer. In such a case, the digital camera or the printer functions as an image processing apparatus. During processing in the printer, the image processed as described above can be printed on a recording medium. This processing can be executed for image data converted into density data.

According to the above-described exemplary embodiments, a point light source can be appropriately determined, and the determined point light source can be appropriately blurred.

The exemplary embodiments can be realized by executing the following processing. That is, software (program) for achieving the functions of the exemplary embodiments is supplied to a system or an apparatus via a network or various storage media, and a computer (CPU or MPU) of the system or the apparatus reads the program to execute it. The program can be executed by one computer or by associating a plurality of computers. There is no need to realize all the processes by software. Some or all of the programs can be achieved by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-161445 filed Jul. 23, 2011, which is hereby incorporated by reference herein in its entirety.

What is claimed is:

1. An image processing apparatus comprising:
an input unit configured to input image data;
a detection unit configured to detect a region corresponding to local light in an image represented by the image data input by the input unit; and
a processing unit configured to perform blur processing on the region corresponding to the local light and detected by the detection unit,
wherein the processing unit varies, according to a position of the region corresponding to the local light and detected by the detection unit, a size and/or a shape of an area on which to perform the blur processing.

2. The image processing apparatus according to claim 1, wherein the processing unit makes the area on which to perform the blur processing flatter as the region corresponding to the local light is more away from a center of the image represented by the image data input by the input unit.

3. The image processing apparatus according to claim 2, wherein the processing unit makes the area on which to perform the blur processing flat in a shape rotated around the center of the image represented by the image data input by the input unit.

4. The image processing apparatus according to claim 1, wherein the processing unit makes the area on which to perform the blur processing wider as the region corresponding to the local light is more away from a center of the image represented by the image data input by the input unit.

5. The image processing apparatus according to claim 1, wherein the processing unit makes the area on which to perform the blur processing closer to a circle shape as the region corresponding to the local light approaches a center of the image represented by the image data input by the input unit.

6. The image processing apparatus according to claim 1, further comprising a setting unit configured to set an enlarged region surrounding the region corresponding to the local light and detected by the detection unit,
wherein the processing unit performs the blur processing on the enlarged region set by the setting unit, which includes the region corresponding to the local light and detected by the detection unit.

7. The image processing apparatus according to claim 1, wherein the processing unit performs blur processing by using a blurring mask for acquiring a blurred image of the local light.

8. The image processing apparatus according to claim 7, wherein the blurring mask for blur correction at the point P1 (x, y) is formed into an elliptic shape having a long side R0 and a short side R (x, y), and rotated by an angle θ°, wherein the short side R (x, y) is defined in the below formula:

$$R(x,y)=R0\times(\text{width}-(I/2))/\text{width}$$

where $I=(x^2+y^2)^{1/2}$

θ: angle [θ°] between a straight line connecting the center point P0 (0, 0) and the point P1 (x, y) and the x axis.

9. The image processing apparatus according to claim 7, wherein the blurring mask for blur correction at the point P1 (x, y) is formed into an elliptic shape having a long side R' (x, y) and a short side R (x, y), and rotated by an angle θ°, wherein the long side R' (x, y) is defined in the below formula:

$$R'(x,y)=R0\times\cos h(Z)$$

where $Z=I/(\text{width})\times n/2$, $I=(x^2+y^2)^{1/2}$

θ: angle [°] between a straight line connecting the center point P0 (0, 0) and the point P1 (x, y) and the x axis.

10. The image processing apparatus according to claim 1, wherein the detection unit detect a pixel which is included in a region that is composed of a pixel group of point light source candidates including the pixel and that is equal to or less than a predetermined size, and which has a difference from a luminance value of a surrounding pixel larger than a fixed value, as a region corresponding to local light.

11. An image processing method for an image processing apparatus comprising:
detecting a region corresponding to local light in an image represented by input image data;
performing blur processing on the detected region corresponding to the local light; and
varying a size and/or a shape of an area on which to perform the blur processing according to a position of the region when performing blur processing on the detected region corresponding to the local light.

12. The method according to claim 11, wherein the region on which the blur processing is performed, becomes more asymmetric as the region corresponding to the local light is farther away from a center of the image.

13. The method according to claim 11, wherein:
a first line passes through a center of the region and a center of an area of the image;
a first dimension is a length of the region that intersects the first line;
a second dimension is a length of the region along a second line that is orthogonal to the first line and passes through the center of the region;
a first ratio is equal the second dimension divided by the first dimension; and
the first ratio increases monotonically as a distance between the center of the region and the center of the area of the image increases.

14. The method according to claim 13, wherein the area of the image is the entire image.

15. The method according to claim 13, wherein the first ratio is 1 when region is at the center of the area of the image.

16. The method according to claim 11, wherein the local light is a point light source.

17. A non-transitory computer-readable storage medium storing a program that causes a computer to execute the image processing method according to claim 11.

* * * * *